United States Patent
Nakamura

(10) Patent No.: US 9,380,290 B2
(45) Date of Patent: *Jun. 28, 2016

(54) STEREOSCOPIC VIDEO PROCESSOR, RECORDING MEDIUM FOR STEREOSCOPIC VIDEO PROCESSING PROGRAM, STEREOSCOPIC IMAGING DEVICE AND STEREOSCOPIC VIDEO PROCESSING METHOD

(71) Applicant: FUJIFILM Corporation, Tokyo (JP)

(72) Inventor: Satoshi Nakamura, Saitama (JP)

(73) Assignee: FUJIFILM CORPORATION, Tokyo (JP)

( * ) Notice: Subject to any disclaimer, the term of this patent is extended or adjusted under 35 U.S.C. 154(b) by 253 days.

This patent is subject to a terminal disclaimer.

(21) Appl. No.: 13/949,707

(22) Filed: Jul. 24, 2013

(65) Prior Publication Data

US 2013/0308917 A1 Nov. 21, 2013

Related U.S. Application Data

(63) Continuation of application No. PCT/JP2011/078647, filed on Dec. 12, 2011.

(30) Foreign Application Priority Data

Jan. 25, 2011 (JP) ................................. 2011-013331

(51) Int. Cl.
*H04N 13/00* (2006.01)
*G03B 35/08* (2006.01)

(52) U.S. Cl.
CPC ............ *H04N 13/0055* (2013.01); *G03B 35/08* (2013.01); *H04N 13/0022* (2013.01); *H04N 13/0066* (2013.01); *H04N 2213/007* (2013.01)

(58) Field of Classification Search
CPC ............... G03B 35/08; H04N 13/0022; H04N 13/0055; H04N 13/0066; H04N 2213/007
USPC ....................................... 348/42–60; 386/224
See application file for complete search history.

(56) References Cited

U.S. PATENT DOCUMENTS 5,726,704 A * 3/1998 Uomori .............. H04N 13/0014
348/47
6,005,607 A 12/1999 Uomori et al.
(Continued)

FOREIGN PATENT DOCUMENTS

CN 1788497 A 6/2006
JP 08-009421 A 1/1996
(Continued)

OTHER PUBLICATIONS

Chinese Office Action, dated Jul. 13, 2015, in related application No. 201180066035.X.
(Continued)

*Primary Examiner* — Thai Tran
*Assistant Examiner* — Stephen Smith
(74) *Attorney, Agent, or Firm* — Birch, Stewart, Kolasch & Birch, LLP

(57) ABSTRACT

A stereoscopic video reproduction device creates and records a stereoscopic video file having, as attached information of the stereoscopic video in advance, information required at the time of adjusting a parallax amount of the stereoscopic video such that binocular fusion is possible regardless of a screen size of a stereoscopic display. The parallax amount of each feature point is calculated and at least the maximum parallax amount on a distant view side is acquired. Further, the largest GOP maximum parallax amount is acquired and the GOP maximum display size is acquired in which binocular fusion is possible at the time of displaying the stereoscopic image by the right and left viewpoint images on the stereoscopic display based on this GOP maximum parallax amount. Together with the stereoscopic video, the acquired GOP maximum display size and GOP maximum parallax amount are recorded in a 3D video file as attached information.

14 Claims, 21 Drawing Sheets

(56) References Cited

U.S. PATENT DOCUMENTS

| | | | |
|---|---|---|---|
| 6,163,337 A * | 12/2000 | Azuma et al. | G06T 7/0022 348/43 |
| 6,549,650 B1 | 4/2003 | Ishikawa et al. | |
| 6,864,910 B1 | 3/2005 | Ogino et al. | |
| 7,463,257 B2 | 12/2008 | Martin | |
| 7,605,776 B2 | 10/2009 | Satoh et al. | |
| 7,636,088 B2 | 12/2009 | Nomura et al. | |
| 7,652,665 B2 | 1/2010 | Fukushima et al. | |
| 7,889,196 B2 | 2/2011 | Nomura et al. | |
| 8,208,008 B2 | 6/2012 | Oota et al. | |
| 8,243,121 B2 | 8/2012 | Nakamura et al. | |
| 8,390,674 B2 | 3/2013 | Kim et al. | |
| 8,482,600 B2 | 7/2013 | Lee | |
| 8,736,671 B2 | 5/2014 | Nakamura | |
| 2006/0192776 A1 | 8/2006 | Nomura et al. | |
| 2007/0171277 A1* | 7/2007 | Shioi et al. | H04N 13/0048 348/54 |
| 2007/0257902 A1* | 11/2007 | Satoh et al. | H04N 13/0003 345/419 |
| 2009/0122134 A1* | 5/2009 | Joung et al. | H04N 13/0066 348/42 |
| 2010/0039499 A1 | 2/2010 | Nomura et al. | |
| 2011/0007131 A1* | 1/2011 | Okada et al. | H04N 13/0022 348/42 |
| 2011/0090323 A1* | 4/2011 | Shibata | H04N 13/0018 348/54 |
| 2011/0242104 A1* | 10/2011 | Zhang et al. | H04N 13/0003 345/419 |
| 2012/0139910 A1* | 6/2012 | Lee et al. | G06T 19/20 345/419 |
| 2013/0044188 A1 | 2/2013 | Nakamura | |
| 2013/0050439 A1* | 2/2013 | Nakamura | G03B 35/08 348/50 |
| 2013/0093859 A1 | 4/2013 | Nakamura | |
| 2013/0170737 A1 | 7/2013 | Arita et al. | |
| 2013/0182072 A1* | 7/2013 | Seo et al. | H04N 13/004 348/43 |
| 2013/0308917 A1 | 11/2013 | Nakamura | |
| 2013/0315558 A1 | 11/2013 | Nakamura | |
| 2013/0342654 A1 | 12/2013 | Nakamura | |

FOREIGN PATENT DOCUMENTS

| | | |
|---|---|---|
| JP | 9-121370 A | 5/1997 |
| JP | 2004-180069 A | 6/2004 |
| JP | 2004-334833 A | 11/2004 |
| JP | 2005-167310 A | 6/2005 |
| JP | 2005-217874 A | 8/2005 |
| JP | 2005-260748 A | 9/2005 |
| JP | 2008-103820 A | 5/2008 |
| JP | 2008-109267 A | 5/2008 |
| JP | 2009-130681 A | 6/2009 |
| WO | WO 2011/136137 A1 | 11/2011 |

OTHER PUBLICATIONS

Chinese Office Action and Search Report and English translation thereof, dated Dec. 3, 2014, for Chinese Application No. 201180066035.X.

Japanese Office Action and English translation thereof, dated Feb. 24, 2015, for Japanese Patent Application No. 2012-554636.

Chinese Office Action and Search Report for Chinese Application No. 201180020925.7, dated Sep. 3, 2014, with an English translation.

International Search Report (Form PCT/ISA/210) for International Application No. PCT/JP2011/059911, dated Jul. 19, 2011.

* cited by examiner

RECORD (GOP MAXIMUM PARALLAX AMOUNT AND
GOP MAXIMUM DISPLAY SIZE) TWO GOPS BEFORE

COLLECTIVELY RECORD (GOP MAXIMUM PARALLAX
AMOUNT AND GOP MAXIMUM DISPLAY SIZE)

FIG.14
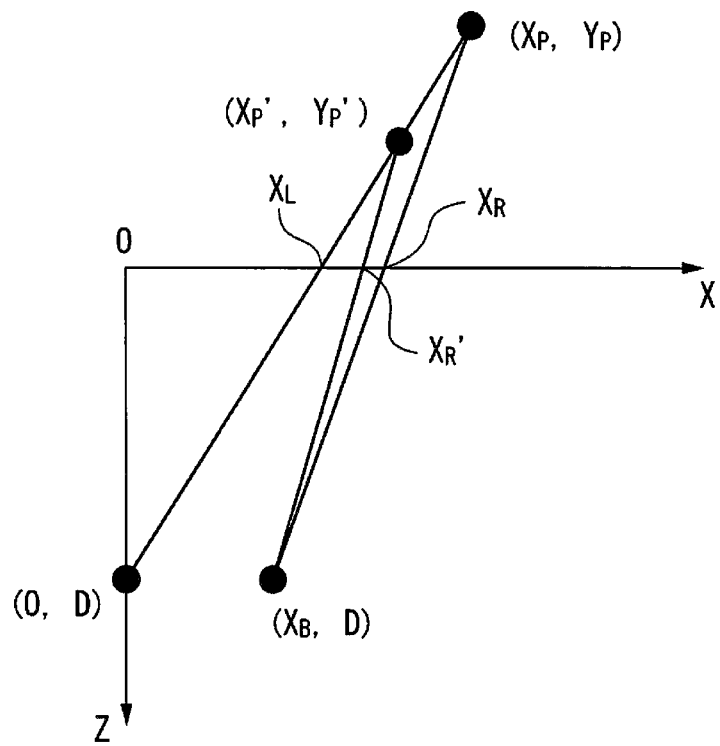
FIG.15
(a)
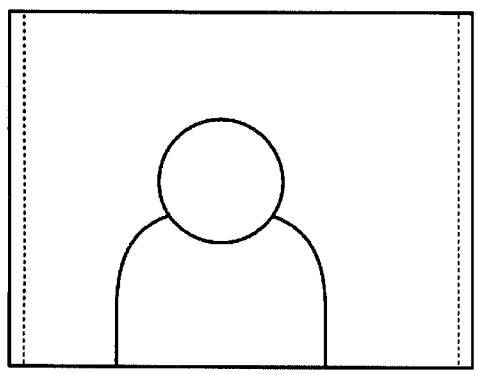
(b)
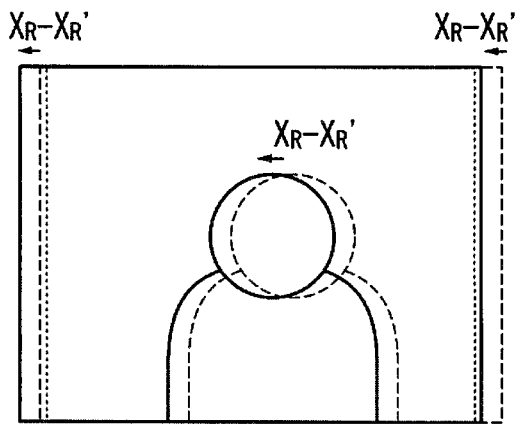

US 9,380,290 B2

STEREOSCOPIC VIDEO PROCESSOR, RECORDING MEDIUM FOR STEREOSCOPIC VIDEO PROCESSING PROGRAM, STEREOSCOPIC IMAGING DEVICE AND STEREOSCOPIC VIDEO PROCESSING METHOD

CROSS-REFERENCE TO RELATED APPLICATIONS

This application is a continuation application and claims the priority benefit under 35 U.S.C. §120 of PCT Application No. PCT/JP2011/078647 filed on Dec. 12, 2011 which application designates the U.S., and also claims the priority benefit under 35 U.S.C. §119 of Japanese Patent Application No. 2011-013331 filed on Jan. 25, 2011 which application is all hereby incorporated by reference in their entireties.

TECHNICAL FIELD

The present invention relates to a stereoscopic video processor, a recording medium for a stereoscopic video processing program, a stereoscopic imaging device and a stereoscopic video processing method. Specifically, the present invention relates to a technique of recording a stereoscopic video in which a stereoscopic image formed with a plurality of viewpoint images is consecutively provided in a time axis direction, in one stereoscopic video file.

BACKGROUND ART

A stereoscopic imaging device takes images of an object in right and left viewpoints using two right and left imaging units arranged with parallax, acquires the viewpoint image for the left eye and the viewpoint image for the right eye respectively and records them in a recording medium. When these acquired right and left viewpoint images are read from the recording medium, input in a 3D display that can perform three-dimensional (3D) display, and are displayed such that the viewpoint image for the left eye and the viewpoint image for the right eye can be visually checked by right and left eyes respectively, it is possible to recognize the result as a stereoscopic video.

By the way, the parallax amount between the recorded right and left viewpoint images varies depending on the change in an imaging scene, the movement of the object, the change in the zoom magnification or the like, and, meanwhile, the 3D display has various screen sizes. Therefore, in a case where reproduction display of a stereoscopic video is to be performed, there is a case where the parallax amount for the stereoscopic video is not suitable for the size of the 3D display. In such a case, there arises a problem that the pop-up amount and pop-down amount from the screen are excessive and it is not possible to recognize the stereoscopic video as a natural stereoscopic video.

PTL 1 discloses a technique of: acquiring suitable screen size information related to the screen size suitable for reproduction of a stereoscopic image, display screen size information of a 3D display, suitable visual distance information related to the suitable distance to a display screen for an observer to view the display screen at the time of reproduction, and visual distance information related to the distance from the observer to the display screen of the 3D display, in addition to image information that can be stereoscopically viewed; setting the shift amount (offset) between the left eye image and the right eye image based on these items of information; and adjusting the stereoscopic feeling of the displayed image.

CITATION LIST

Patent Literature

{PTL 1} Japanese Patent Application Laid-Open No. 2004-180069

SUMMARY OF INVENTION

Technical Problem

It is not clear whether the stereoscopic image disclosed in PTL 1 is a still image or a video. In the case of a stereoscopic video, the parallax amount of right and left viewpoint images varies depending on the change in an imaging scene, the movement of an object, the change in the zoom magnification, and so on. Even if, for the sake of argument, the parallax amount of a stereoscopic video is adjusted by the technique disclosed in PTL 1 such that the stereoscopic video has a natural pop-up amount, it is considered to adjust the parallax amount in units of frames of the stereoscopic video. However, in this case, there is a problem that a feature as the stereoscopic video in which the stereoscopic feeling varies is lost and an unnatural stereoscopic video is provided.

By the way, on a display screen of a 3D display, in a case where the right eye image has a parallax in the right direction with respect to the left eye image, a stereoscopic image is visually checked as an image with a larger depth than the display screen, but, when the screen size of the 3D display increases, this parallax increases too. When the parallax exceeds a man's binocular interval, binocular fusion is impossible (i.e. binocular vision is impossible).

Although PTL 1 discloses acquiring a stereoscopic image in which the optimal stereoscopic degree (i.e. depth amount) is adjusted in proportion to the display screen size of the 3D display, it does not disclose adjusting the shift amount between the left eye image and the right eye image such that the above-mentioned binocular fusion is not impossible. Further, since it does not contain description related to the maximum parallax amount of the distant view side (or depth side) of a stereoscopic image either, the stereoscopic image display device disclosed in PTL 1 cannot adjust the shift amount between the left eye image and the right eye image such that the parallax does not exceed the man's binocular interval regardless of the screen size of the 3D display.

The present invention is made in view of the above circumstances and it is an object to provide a stereoscopic video processor, a stereoscopic video processing program, a stereoscopic imaging device and a stereoscopic video processing method in which: a stereoscopic video reproduction device can create and record a stereoscopic video file having, as attached information of the stereoscopic video in advance, information required at the time of adjusting the parallax amount of a stereoscopic video such that binocular fusion is possible regardless of the screen size of the stereoscopic display; and, especially, it is possible to create and record the stereoscopic video file having attached information that enables a natural stereoscopic video even if the parallax adjustment of the stereoscopic video is performed.

Solution to Problem

A stereoscopic video processor according to the first aspect of the present invention to attain the above object includes: a stereoscopic video acquisition unit that acquires a stereoscopic video in which a stereoscopic image formed with a plurality of viewpoint images is consecutively provided in a time axis direction; a parallax amount calculation unit that calculates a parallax amount indicating a shift amount between feature points with a common feature, from a plurality of viewpoint images every frame of the acquired stereoscopic video; a maximum parallax amount acquisition unit that acquires a maximum parallax amount on a distant view side from the calculated parallax amount of each feature point every frame; an intra-interval maximum parallax amount acquisition unit that acquires an intra-interval maximum parallax amount which is the largest in every predetermined interval of the stereoscopic video, in the acquired maximum parallax amount on the distant view side; an intra-interval maximum display size acquisition unit that acquires an intra-interval maximum display size in which binocular fusion is possible when the stereoscopic video is displayed on a stereoscopic display every predetermined interval, based on the intra-interval maximum parallax amount acquired every predetermined interval of the stereoscopic video; and a recording unit that generates a stereoscopic video file in which the stereoscopic video is recorded, records the stereoscopic video file in a recording medium, records the stereoscopic video in the stereoscopic video file and records the intra-interval maximum display size every predetermined interval in the stereoscopic video file as attached information.

According to the first aspect, it is possible to: calculate the parallax amount indicating a shift amount between feature points with a common feature from a plurality of viewpoint images every frame of an acquired stereoscopic video; acquire the maximum parallax amount on the distant view side from the calculated parallax amount of each feature point; acquire the intra-interval maximum parallax amount which is the largest in every predetermined interval of the stereoscopic video, in the maximum parallax amount every frame; acquire the intra-interval maximum display size in which binocular fusion is possible when the stereoscopic video is displayed on a stereoscopic display in the interval, based on this intra-interval maximum parallax amount; and, since this intra-interval maximum display size is recorded as attached information in the stereoscopic video file, by comparing the display size of the stereoscopic display on which it is to be displayed and the intra-interval maximum display size every predetermined interval of the stereoscopic video file recorded in the attached information at the time of reading the stereoscopic video file in the stereoscopic video reproduction device, easily decide whether binocular vision is possible every predetermined interval. Also, in a case where it is decided that the binocular vision is not possible, it is possible to correct the parallax of the stereoscopic video in the corresponding interval using the intra-interval maximum display size, and it is possible to reduce parallax correction processing in the stereoscopic video reproduction device. Further, since the intra-interval maximum display size is recorded every predetermined interval of the stereoscopic video, in the case of parallax correction, it is possible to perform the parallax correction every interval, and, even if the parallax of the stereoscopic video is corrected, it is possible to provide a natural stereoscopic video.

According to the second aspect of the present invention, in the stereoscopic video processor of the first aspect, the recording unit further records the intra-interval maximum parallax amount acquired every predetermined interval of the stereoscopic video by the intra-interval maximum parallax amount acquisition unit, as the attached information of the stereoscopic video file.

The stereoscopic video processor according to the third aspect of the present invention includes: a stereoscopic video acquisition unit that acquires a stereoscopic video in which a stereoscopic image formed with a plurality of viewpoint images is consecutively provided in a time axis direction; a parallax amount calculation unit that calculates a parallax amount indicating a shift amount between feature points with a common feature, from a plurality of viewpoint images every frame of the acquired stereoscopic video; a maximum parallax amount acquisition unit that acquires a maximum parallax amount on a distant view side from the calculated parallax amount of each feature point every frame; an intra-interval maximum parallax amount acquisition unit that acquires an intra-interval maximum parallax amount which is the largest in every predetermined interval of the stereoscopic video, in the acquired maximum parallax amount on the distant view side; and a recording unit that generates a stereoscopic video file in which the stereoscopic video is recorded, records the stereoscopic video file in a recording medium, records the stereoscopic video in the stereoscopic video file and records the intra-interval maximum parallax amount every predetermined interval in the stereoscopic video file as attached information.

The intra-interval maximum parallax amount can be used as information to decide whether the stereoscopic video in the corresponding interval can be stereoscopically viewed by the stereoscopic video reproduction device as well as the intra-interval maximum display size, and can be used as information to correct the parallax of the stereoscopic video in the corresponding interval.

According to the fourth aspect of the present invention, in the stereoscopic video processor of the third aspect, an intra-interval maximum display size acquisition unit is further included to acquire an intra-interval maximum display size in which binocular fusion is possible when the stereoscopic video is displayed on a stereoscopic display every predetermined interval, based on the intra-interval maximum parallax amount acquired every predetermined interval of the stereoscopic video, wherein the recording unit further records the intra-interval maximum display size every predetermined interval, as the attached information, in the stereoscopic video file.

According to the fifth aspect of the present invention, in the stereoscopic video processor of one of the first to fourth aspects, the recording unit further records an assumed visual distance corresponding to a distance between a viewer and a stereoscopic display, which is suitable to observe the stereoscopic video, as the attached information of the stereoscopic video file.

According to the sixth aspect of the present invention, in the stereoscopic video processor of one of the first to fifth aspects, the maximum parallax amount acquisition unit acquires a maximum parallax amount on a near view side in the calculated parallax amount of each feature point, and the intra-interval maximum parallax amount acquisition unit acquires an intra-interval maximum parallax amount which is the largest in the predetermined interval every predetermined interval, in the acquired maximum parallax amount on the near view side.

By this means, it is possible to determine the maximum display size in which binocular vision is appropriately possible even on the near view side.

According to the seventh aspect of the present invention, in the stereoscopic video processor of the first, second or fourth aspect, a representative image setting unit is further included to set one of viewpoint images at N (N is an integral number equal to or greater than three) viewpoints acquired by the stereoscopic video acquisition unit as a representative image, where: the maximum parallax amount acquisition unit acquires (N−1) items of maximum parallax amounts on the distant view side in association with two viewpoint images of different combinations, which are formed with the representative image and each of viewpoint images at (N−1) viewpoints excluding the representative image of the viewpoint images at the N viewpoints; the intra-interval maximum display size acquisition unit acquires (N−1) items of intra-interval maximum display sizes, each of which is the maximum in the predetermined interval, every predetermined interval, based on the acquired (N−1) items of maximum parallax amounts on the distant view side; and the recording unit records the acquired (N−1) items of intra-interval maximum display sizes in the stereoscopic video file as the attached information.

By this means, in the stereoscopic video reproduction device, at the time of reproducing the stereoscopic video in a predetermined interval, it is possible to refer to (N−1) items of intra-interval maximum display sizes, and, by comparison with a display size to be displayed, it is possible to easily select a stereoscopic video suitable for binocular vision.

According to the eighth aspect of the present invention, in the stereoscopic video processor of one of the first to seventh aspects, a virtual viewpoint image generation unit is further included to generate one or more of virtual viewpoint images corresponding to arbitrary virtual viewpoints, based on at least one viewpoint image of a plurality of viewpoint images acquired by the stereoscopic video acquisition unit and the parallax amount calculated by the parallax amount calculation unit.

By this means, in the stereoscopic video reproduction device having read the stereoscopic video file, in a case where a virtual viewpoint image is recorded, it is possible to perform display using the virtual viewpoint image without performing parallax adjustment.

According to the ninth aspect of the present invention, in the stereoscopic video processor of the first, second or fourth aspect, a representative image setting unit is included to set one of viewpoint images at N (N is an integral number equal to or greater than three) viewpoints including the plurality of viewpoint images and virtual viewpoint images as a representative image, where: the maximum parallax amount acquisition unit acquires (N−1) items of maximum parallax amounts on the distant view side in association with two viewpoint images of different combinations, which are formed with the representative image and each of viewpoint images at (N−1) viewpoints excluding the representative image of the viewpoint images at the N viewpoints; the intra-interval maximum display size acquisition unit acquires (N−1) items of intra-interval maximum display sizes, each of which is the maximum in the predetermined interval, every predetermined interval, based on the acquired (N−1) items of maximum parallax amounts on the distant view side; and the recording unit records the acquired (N−1) items of intra-interval maximum display sizes in the stereoscopic video file as the attached information.

By this means, in the stereoscopic video reproduction device, at the time of reproducing the stereoscopic video in a predetermined interval, it is possible to refer to (N−1) items of intra-interval maximum parallax amounts and easily select a stereoscopic video suitable for binocular vision.

According to the tenth aspect of the present invention, in the stereoscopic video processor of one of the first to ninth aspects, the stereoscopic video file is an MPEG file in which a plurality of viewpoint images are sequentially recorded every one GOP formed with a plurality of frames and the predetermined interval of the stereoscopic video is an interval corresponding to a predetermined number of GOPs equal to one or two, or greater than two.

According to the eleventh aspect of the present invention, in the stereoscopic video processor of one of the first to tenth aspects, a scene change detection unit is included to detect a scene change of the acquired stereoscopic video, where the predetermined interval of the stereoscopic video is an interval every scene distinguished by the scene change detected by the scene change detection unit.

According to the twelfth aspect of the present invention, in the stereoscopic video processor of one of the first to eleventh aspects, the recording unit records at least one of the intra-interval maximum display size and the intra-interval maximum parallax amount acquired every interval, in a head of an interval a predetermined number of intervals before the interval, or a head of the stereoscopic video file.

By this means, in the stereoscopic video reproduction device having read the stereoscopic video file, it is possible to detect in advance whether the parallax of the stereoscopic video in the predetermined interval should be adjusted, and calculate in advance the parallax amount to be adjusted.

According to the thirteenth aspect of the present invention, in the stereoscopic video processor of the seventh or ninth aspect, the recording unit records the viewpoint images at the N viewpoints in order of viewpoint arrangement or in order from the viewpoint image closer to a central viewpoint.

According to the fourteenth aspect of the present invention, in the stereoscopic video processor of the eighth and ninth aspect, at a time of recording the plurality of viewpoint images and virtual viewpoint images in the stereoscopic video file, the recording unit records viewpoint information indicating whether each image is an image at an actual viewpoint or an image at a virtual viewpoint, as the attached information of the stereoscopic video file.

By this means, in the stereoscopic video reproduction device having read the stereoscopic video file, it is possible to distinguish between a video at an actual viewpoint and a video at a virtual viewpoint.

According to the fifteenth aspect of the present invention, in the stereoscopic video processor of the first, second, fourth, seventh or ninth aspect, the intra-interval maximum display size acquisition unit acquires a maximum display size in a display size in which an image shift amount on a stereoscopic display corresponding to the intra-interval maximum parallax amount on the distant view side acquired by the intra-interval maximum parallax amount acquisition unit does not exceed man's binocular interval, as an intra-interval maximum display size in which binocular fusion is possible. By this means, it is possible to appropriately acquire the intra-interval maximum display size.

According to the sixteenth aspect of the present invention, in the stereoscopic video processor of the fifteenth aspect, based on the intra-interval maximum parallax amount on the distant view side acquired by the intra-interval maximum parallax amount acquisition unit, the intra-interval maximum display size acquisition unit reads a corresponding maximum display size from a storage unit in which a maximum display size corresponding to a maximum parallax amount is recorded in advance, or calculates the intra-interval maximum display size using an equation including a predetermined value indicating the man's binocular interval. By this means, it is possible to appropriately acquire the maximum display size.

A stereoscopic video processing program according to the seventeenth aspect of the present invention causes a computer to realize the stereoscopic video processor according to one of the first to sixteenth aspects.

According to the eighteenth aspect of the present invention, a programmable recording medium stores, in a physical manner, a stereoscopic video processing program of a machine-readable instruction to cause a computer to realize the stereoscopic video processor according to one of the first to sixteenth aspects.

A stereoscopic imaging device according to the nineteenth aspect of the present invention includes: an imaging unit that functions as the stereoscopic video acquisition unit; and a stereoscopic video processor according to one of the first to sixteenth aspects.

The stereoscopic video processing method according to the twentieth aspect of the present invention includes the steps of: acquiring a stereoscopic video in which a stereoscopic image formed with a plurality of viewpoint images is consecutively provided in a time axis direction; calculating a parallax amount indicating a shift amount between feature points with a common feature, from a plurality of viewpoint images every frame of the acquired stereoscopic video; acquiring a maximum parallax amount on a distant view side from the calculated parallax amount of each feature point every frame; acquiring an intra-interval maximum parallax amount which is the largest in every predetermined interval of the stereoscopic video, in the acquired maximum parallax amount on the distant view side; acquiring an intra-interval maximum display size in which binocular fusion is possible when the stereoscopic video is displayed on a stereoscopic display every predetermined interval, based on the intra-interval maximum parallax amount acquired every predetermined interval of the stereoscopic video; and generating a stereoscopic video file in which the stereoscopic video is recorded, recording the stereoscopic video file in a recording medium, recording the stereoscopic video in the stereoscopic video file and recording the intra-interval maximum display size every predetermined interval in the stereoscopic video file as attached information.

The stereoscopic video processing method according to the twenty-first aspect of the present invention includes the steps of: acquiring a stereoscopic video in which a stereoscopic image formed with a plurality of viewpoint images is consecutively provided in a time axis direction; calculating a parallax amount indicating a shift amount between feature points with a common feature, from a plurality of viewpoint images every frame of the acquired stereoscopic video; acquiring a maximum parallax amount on a distant view side from the calculated parallax amount of each feature point every frame; acquiring an intra-interval maximum parallax amount which is the largest in every predetermined interval of the stereoscopic video, in the acquired maximum parallax amount on the distant view side; and generating a stereoscopic video file in which the stereoscopic video is recorded, recording the stereoscopic video file in a recording medium, recording the stereoscopic video in the stereoscopic video file and recording the intra-interval maximum parallax amount every predetermined interval in the stereoscopic video file as attached information.

Advantageous Effects of Invention

According to the present invention, since the intra-interval maximum display size or intra-interval maximum parallax amount which is the largest in a corresponding interval is acquired every predetermined interval of the stereoscopic video and recorded as attached information in the stereoscopic video file, a stereoscopic video reproduction device having read this stereoscopic video file can easily decide whether the stereoscopic video displayed on a stereoscopic display can be stereoscopically viewed every predetermined interval, based on the intra-interval maximum display size or intra-interval maximum parallax amount every predetermined interval of the stereoscopic video file recorded in attached information. Also, in a case where it is decided that the binocular vision is not possible, it is possible to correct the parallax of the stereoscopic video in the corresponding interval using the intra-interval maximum display size or the intra-interval maximum parallax amount, and it is possible to reduce parallax correction processing in the stereoscopic video reproduction device. Further, since the intra-interval maximum display size is recorded every predetermined interval of the stereoscopic video, in the case of parallax correction, it is possible to perform the parallax correction every interval, and, even if the parallax of the stereoscopic video is corrected, it is possible to provide a natural stereoscopic video.

BRIEF DESCRIPTION OF DRAWINGS

FIG. 14 is a diagram for explaining the principle of parallax shift.

FIG. 15 is a diagram illustrating parallax shift of right and left viewpoint images.

DESCRIPTION OF EMBODIMENTS

In the following, preferable embodiments of the present invention are explained in detail according to the accompanying drawings.

First Embodiment of 3D Video File

A stereoscopic video file (3D video file) according to the first embodiment is explained.

Figure 1:
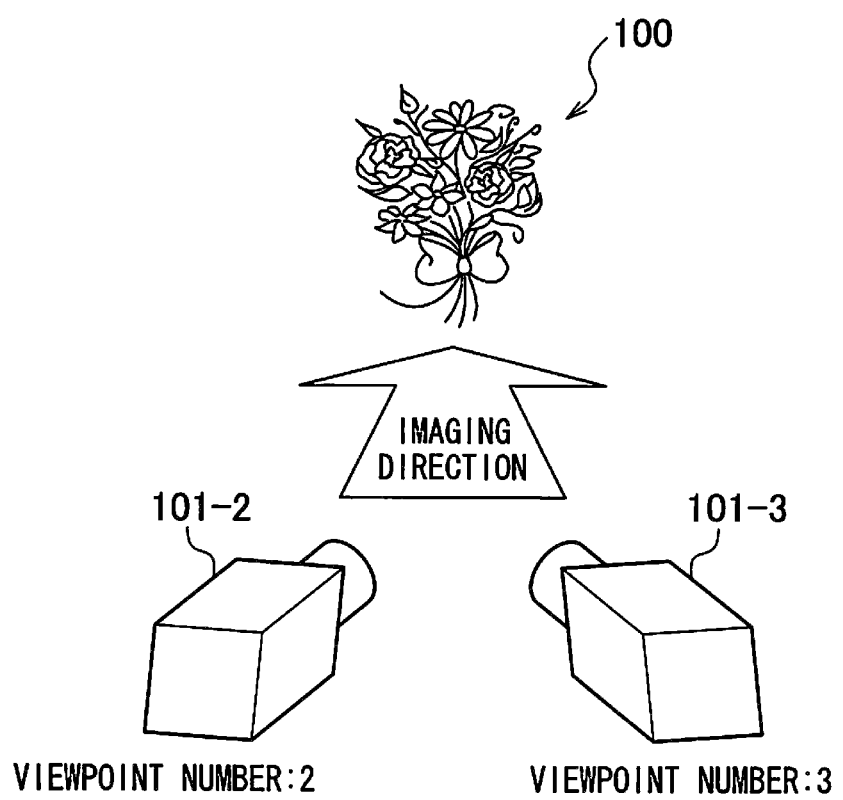
FIG. 1 is a diagram illustrating a state where viewpoint images at two viewpoints are imaged.
Figure 2:
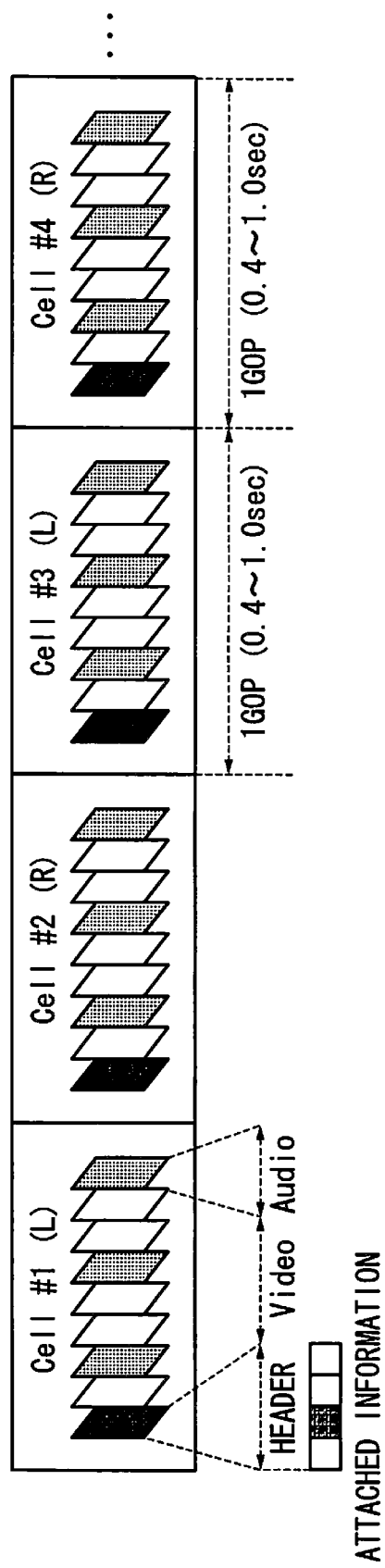
FIG. 2 is a diagram illustrating a first example typically showing a data structure of a 3D video file.

FIG. 1 is a diagram illustrating a state where viewpoint images (or videos) at two viewpoints (i.e. the left viewpoint and the right viewpoint) are imaged from different viewpoints with respect to an object 100 by two imaging devices 101-2 and 101-3, and FIG. 2 is a diagram typically showing a data structure of a 3D video file recording a 3D video formed with the left viewpoint and right viewpoint videos imaged in the imaging devices 101-2 and 101-3 illustrated in FIG. 1.

The 3D video file illustrated in FIG. 2 is a MPEG file in conformity to the MPEG (moving picture expert group) format, and the viewpoint image at the left viewpoint and the viewpoint image at the right viewpoint are alternately coupled in units of one GOP (group of picture: in the MPEG compression, combination of several frames of video signals that are a unit at the time of compression and at the time of reproduction/edit) and formed as one file.

A header area is provided in the head of an area recording the viewpoint image of each GOP, and this header area records attached information such as the image size, the aspect ratio and the frame rate. Also, in the present embodiment, as attached information, all or part of the following attached information is further recorded.

GOP maximum display size (width, height, unit: mm)

Assumed visual distance (distance between a viewer at the time of observing a stereoscopic video and a 3D display) (unit: mm)

GOP maximum parallax amount (near view): parallax amount with respect to image width (%)

GOP maximum parallax amount (distant view): parallax amount with respect to image width (%)

Figure 3:
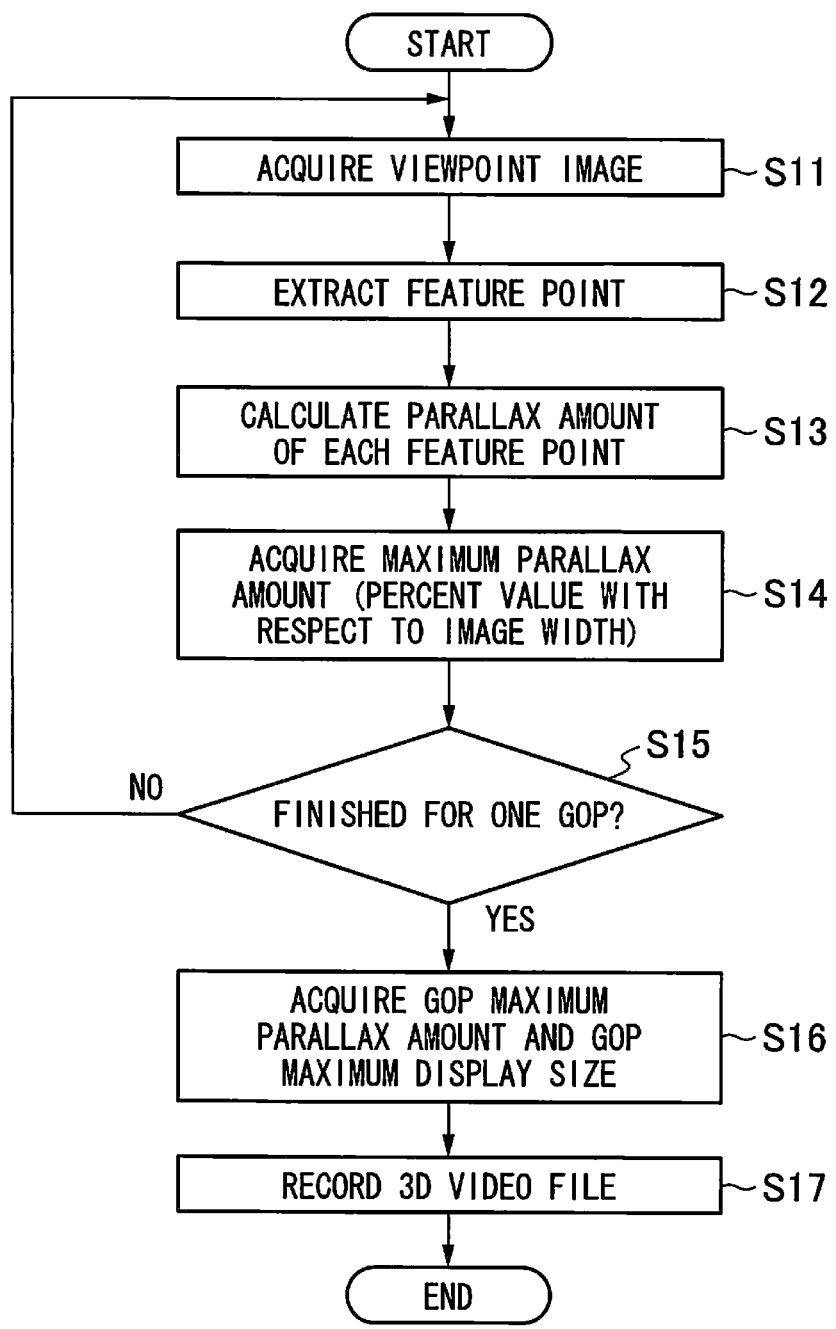
FIG. 3 is a flowchart illustrating imaging/recording processing.

Convergence angle, base line length and imaging unit arrangement (viewpoint number) of device that takes each viewpoint image Imaging/recording processing to record such a 3D video file is explained using the flowchart in FIG. 3.

First, right and left viewpoint images for one frame in a plurality of frames of one GOP corresponding to the left viewpoint and the right viewpoint are acquired (step S11). Here, by the two imaging devices 101-2 and 101-3 as illustrated in FIG. 1, right and left viewpoint images for one frame of a 3D video subjected to 3D video imaging with respect to the object 100 are acquired. Here, it is assumed that the imaging device 101-2 has a viewpoint number 2 and the imaging device 101-3 has a viewpoint number 3.

Next, a plurality of feature points are extracted from right and left viewpoint images (step S12) and the parallax amount in each feature point is calculated (step S13). Here, the parallax amount denotes the difference between the distances from the left ends of the respective viewpoint images in the corresponding feature point between the viewpoint images, and the unit is pixel. From the parallax amount in each feature point calculated in this way, the maximum parallax amount on the near view side and the maximum parallax amount on the distant view side are acquired (step S14).

Figure 4:
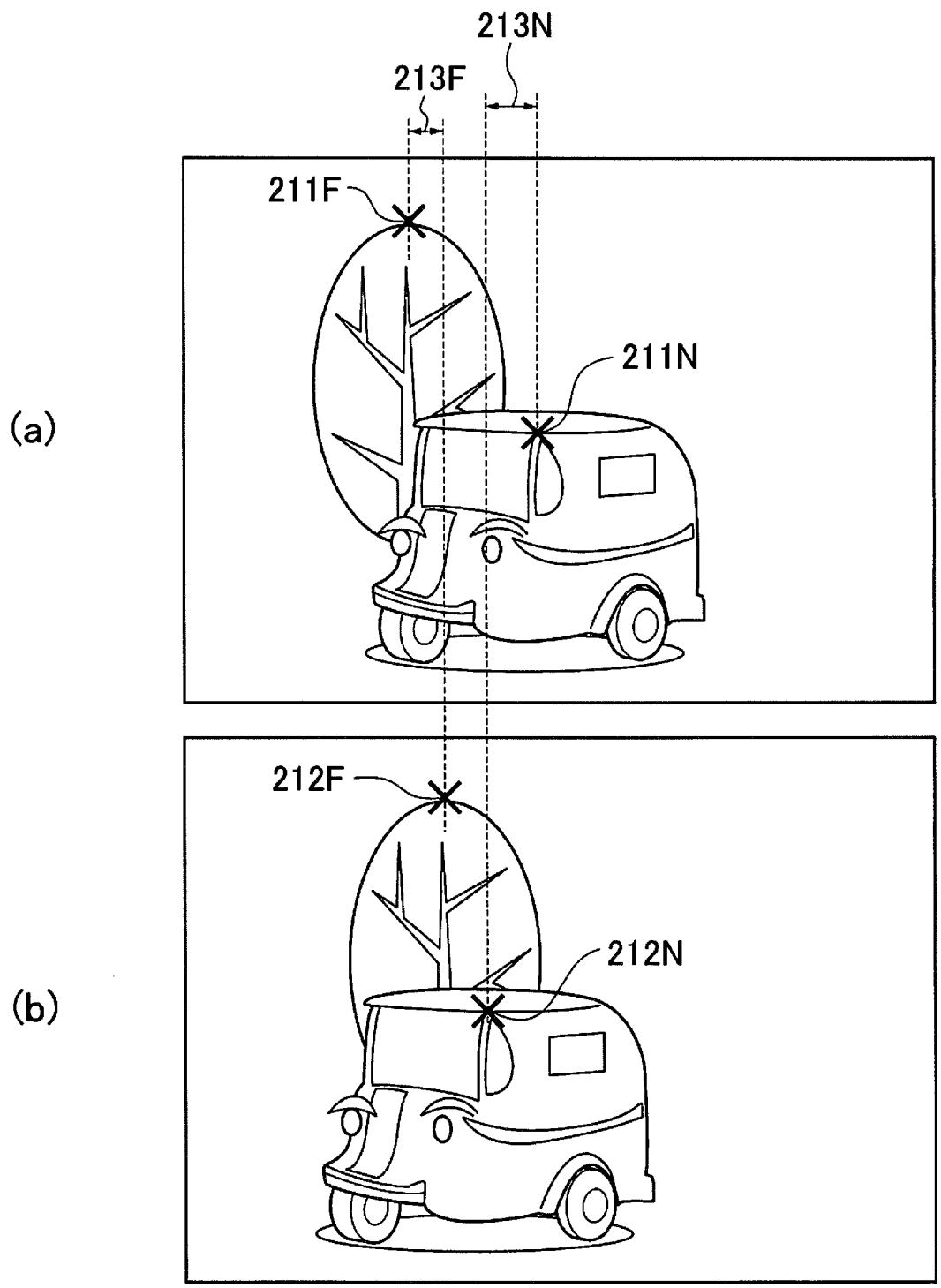
FIG. 4 is a diagram illustrating an example of viewpoint images at two viewpoints.

FIG. 4 is a diagram illustrating an example of right and left viewpoint images, (a) portion of FIG. 4 illustrates a left viewpoint image 201-2 and (b) portion of FIG. 4 illustrates a right viewpoint image 201-3.

In the example of FIG. 4, the maximum parallax amount on the near view side is 213N, and feature points (i.e. maximum parallax amount positions (near view)) with this parallax amount are 211N and 212N, respectively. Also, the maximum parallax amount on the distant view side is 213F, and feature points (i.e. maximum parallax amount positions (distant view)) with this parallax amount are 211F and 212F, respectively. That is, in a case where a stereoscopic image based on these right and left viewpoint images is stereoscopically viewed, it is viewed such that the maximum parallax amount positions (near view) are the nearest and the maximum parallax amount positions (distant view) are the most distant.

The ratios (%) of the maximum parallax amount 213N on the near view side and the maximum parallax amount 213F on the distant view side to the image width are the maximum parallax amount (near view) (%) and the maximum parallax amount (distant view) (%).

Subsequently, it is decided whether to finish acquiring the maximum parallax amounts in all frames of one GOP (step S15), and, in a case where it is not finished (i.e. "in the case of NO"), it returns to step S11 to perform the processing in steps S11 to S14, and, in a case where it is finished (i.e. "in the case of YES"), it proceeds to step S16.

In step S16, the largest maximum parallax amount among the maximum parallax amounts in all frames of one GOP is acquired as a GOP maximum parallax amount. Further, based on this GOP maximum parallax amount, the GOP maximum display size is acquired.

When the parallax amount on the distant view side exceeds man's binocular interval, binocular fusion is impossible in the position of the image and it cannot be stereoscopically viewed. Therefore, according to the ratio (%) of the GOP maximum parallax amount (distant view) to the image width, the maximum display size (i.e. the GOP maximum display size) is acquired within the display size in which the parallax does not exceed the man's binocular interval.

For example, it is assumed that the man's binocular interval is 50 mm, and, if the ratio of the GOP maximum parallax amount (distant view) to the image width is 10%, the maximum display width allowed for binocular vision is 500 mm. That is, in the case of a display with a width of 500 mm or less, right and left images corresponding to the GOP maximum parallax amount (distant view) are displayed without exceeding a binocular interval of 50 mm, and, as a result, the viewer can perform binocular vision.

Here, in a case where a display with an aspect ratio of 16:9 is assumed, the maximum display height is 281.25 mm.

Here, the man's binocular interval may be arbitrarily determined according to the target viewer. For example, when only adults are targeted, a wide value such as 65 mm may be set.

For example, it is assumed that the man's binocular interval is 65 mm, and, if the ratio of the GOP maximum parallax amount (distant view) to the image width is 15%, the GOP maximum display size allowed for binocular vision is about 433 mm. Also, in a case where a 3D display with an aspect ratio of 16:9 is assumed, the height of the GOP maximum display size is about 244 mm.

Also, instead of performing calculation from man's binocular interval, a table recording the maximum display size corresponding to the maximum parallax amount is prepared in advance, and, by referring to this table, the GOP maximum display size may be acquired.

Next, the left viewpoint images and right viewpoint images for one GOP are respectively subjected to MPEG compression, alternately coupled as illustrated in FIG. 2 and recorded as a 3D video file, and, in the first header area of an area in which the viewpoint images in each GOP are recorded, for example, the GOP maximum display size, the GOP maximum parallax amount (distant view) (%) and the GOP maximum parallax amount (near view) (%) acquired in step S16 are recorded as attached information (step S17). Subsequently, by performing the above processing for all GOPs of the 3D video, it is possible to record the 3D video file illustrated in FIG. 2.

The 3D video file recorded as above is read by a stereoscopic video reproduction device at the time when it is displayed on a 3D display. In this case, in the stereoscopic video reproduction device, by comparing the GOP maximum display size recorded in the attached information of the 3D video file and the display size of a 3D display on which it is to be displayed, it is possible to easily decide whether binocular vision is possible. In a case where it is decided that the binocular vision is possible, the recorded 3D video may be displayed as is, and, in a case where it is decided that the binocular vision is not possible, it is possible to correct the parallax of right and left viewpoint images in the corresponding GOP using the GOP maximum display size and the GOP maximum parallax amount, and it is possible to reduce parallax correction processing in a stereoscopic video reproduction device.

Here, in the present embodiment, although the GOP maximum display size is determined based on only the GOP maximum parallax amount on the distant view side, it may be determined taking into consideration the GOP maximum parallax amount on the near view side. By taking into consideration the GOP maximum parallax amount on the near view side, it is possible to determine the GOP maximum display size that enables appropriate binocular vision on not only the distant view side but also the near view side.

For example, the display size in which the near-view parallax amount is equal to or less than 50 mm may be set as the GOP maximum display size. This is because, when the parallax amount on the near view side increases, the viewer feels fatigued for the binocular vision and therefore it is preferable to be equal to or less than a predetermined amount.

Figure 5:
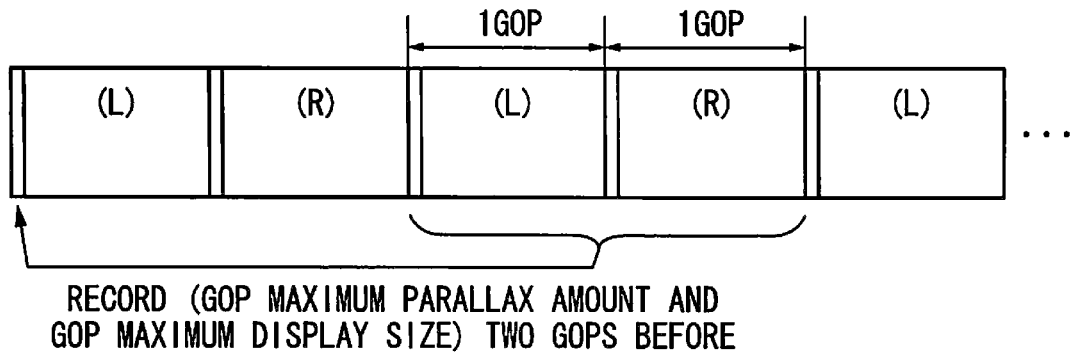
FIG. 5 is a diagram illustrating a second example typically showing a data structure of a 3D video file.
Figure 6:
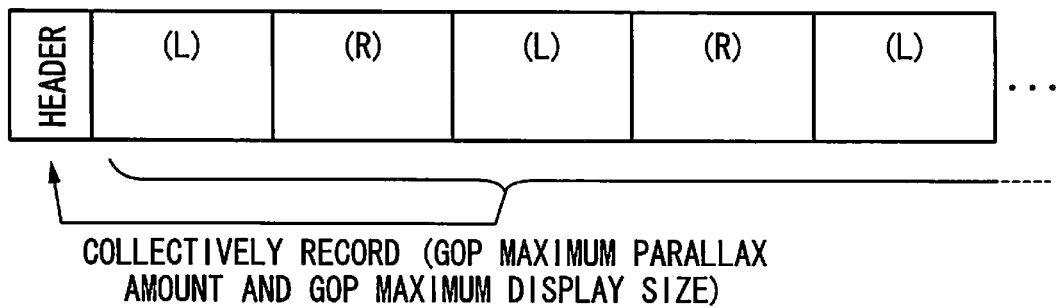
FIG. 6 is a diagram illustrating a third example typically showing a data structure of a 3D video file.

Also, in the present embodiment, although the GOP maximum parallax amount and the GOP maximum display size are recorded as attached information in the first header area of a GOP in which these are acquired, it is not limited to this. As illustrated in FIG. 5, they may be recorded in the first header area of a GOP two GOPs before (i.e. the time for one GOP minute before), and, as illustrated in FIG. 6, the GOP maximum parallax amounts and GOP maximum display sizes acquired from all GOPs may be collectively recorded in the first header area of the 3D video file. According to this, a stereoscopic video reproduction device that reads the 3D video file can detect in advance whether to adjust the parallax of the stereoscopic video in one GOP, and can calculate in advance the parallax amount to be adjusted.

Further, in the present embodiment, although the largest GOP maximum parallax amount and GOP maximum display size in one GOP are acquired, it is not limited to this, and the intra-interval maximum parallax amount and intra-interval maximum display size in each of a predetermined number of GOPs (intervals) set in advance may be acquired and recorded as attached information with respect to the 3D video in the interval.

Second Embodiment of 3D Video File

Figure 7:
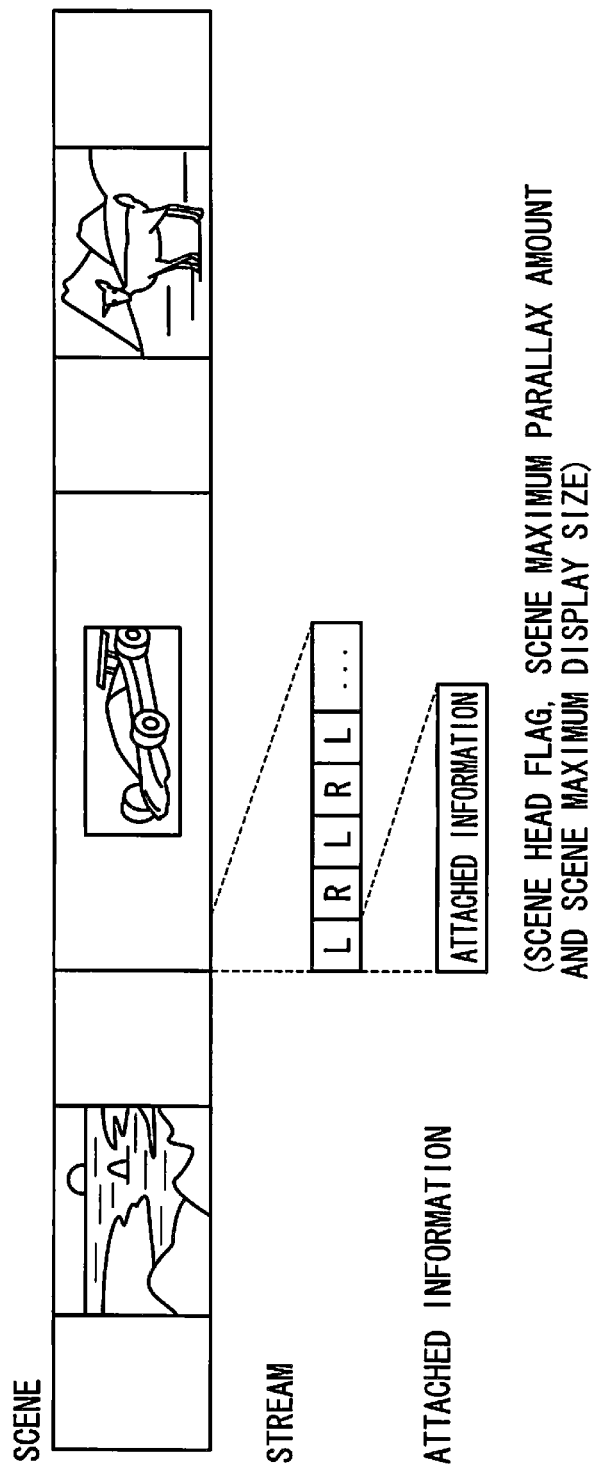
FIG. 7 is a diagram illustrating a fourth example typically showing a data structure of a 3D video file.

In the second embodiment, in a case where a 3D video scene changes as illustrated in FIG. 7, all or part of following attached information is recorded as attached information of the head of the scene.
Flag indicating scene head
Scene maximum display size (width, height, unit: mm)
Assumed visual distance (i.e. distance between the viewer at the time of observing a stereoscopic video and a 3D display) (unit: mm)
Scene maximum parallax amount (near view): parallax amount with respect to image width (%)
Scene maximum parallax amount (distant view): parallax amount with respect to image width (%)
Convergence angle, base line length and imaging unit arrangement (viewpoint number) of device that takes each viewpoint image Further, a flag indicating zoom-in/zoom-out and a flag indicating ON/OFF/Reset of blurring correction may be recorded as attached information.

It is possible to change a scene by a scene change detection unit that detects the scene change from an acquired 3D video. For example, the detection is possible in cases where: the times of time stamps indicating the recording times are separated from each other in previous and subsequent 3D video frames; the correlation of previous and subsequent 3D video frames is checked and there is no correlation; the GOP maximum parallax amount changes over a predetermined threshold in adjacent GOPs; and the blurring correction state changes (ON→OFF, OFF→ON, Reset). Here, the scene change detection method is not limited to the above example and various methods are possible.

The scene head flag denotes a flag indicating the head of each scene in a 3D video file coupling each scene of the 3D video as illustrated in FIG. 7, the scene maximum parallax amount is the parallax amount which is the largest in the 3D video in the scene, and the scene maximum display size is the maximum display size within the display size in which binocular fusion is possible at the time of displaying the scene on a stereoscopic display and which is acquired based on the scene maximum parallax amount in the scene.

Also, as illustrated in FIG. 7, in the 3D video file in which each scene of the 3D video is coupled, for each scene, attached information such as the scene head flag, the scene maximum parallax amount in the scene and the scene maximum display size is recorded at the head of the scene. Here, in addition to the above information, scene length information of the scene is recorded in the attached information at the scene head. The scene length information can be expressed by the number of GOPs forming the scene.

Third Embodiment of 3D Video File

In the first embodiment, an example has been explained using right and left viewpoint images taken from two viewpoints, the number of viewpoints for a 3D video according to the present invention is not limited to two viewpoints and viewpoint images at multiple viewpoints equal to or greater than three viewpoints is possible.

Figure 8:
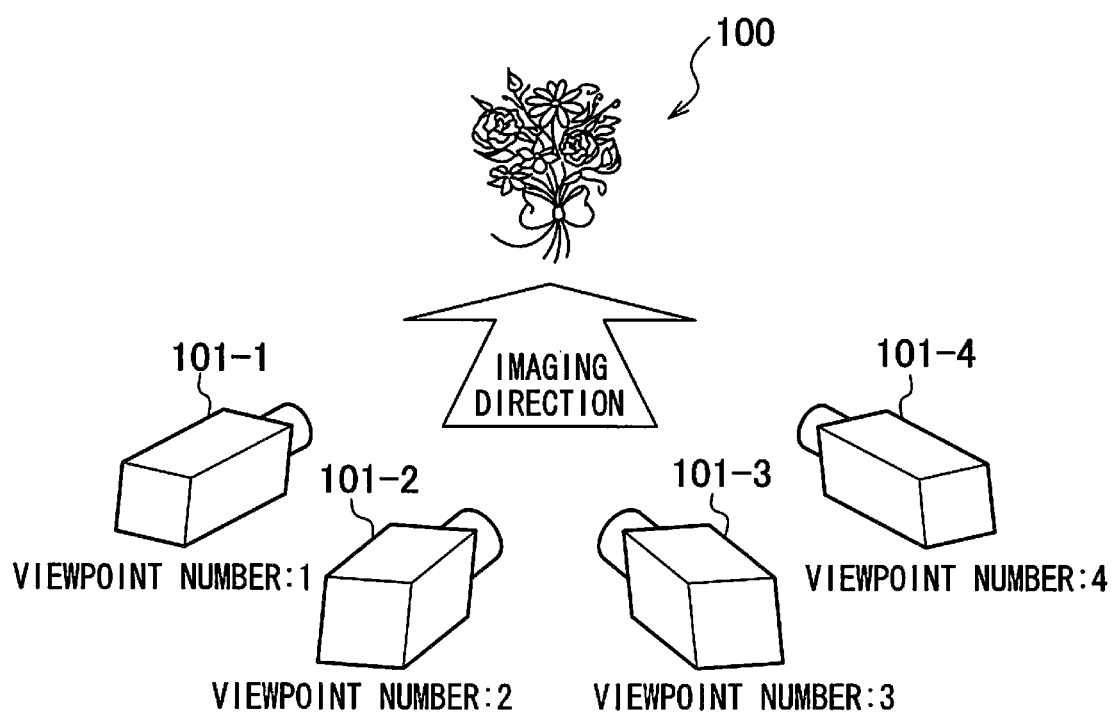
FIG. 8 is a diagram illustrating a state where viewpoint images at four viewpoints are imaged.

FIG. 8 is a diagram illustrating a state where four imaging devices 101-1 to 101-4 take four viewpoint images at different viewpoints with respect to the object 100. Here, it is assumed that the viewpoint numbers of the imaging devices 101-1 to 101-4 are 1 to 4 in order.

Figure 9:
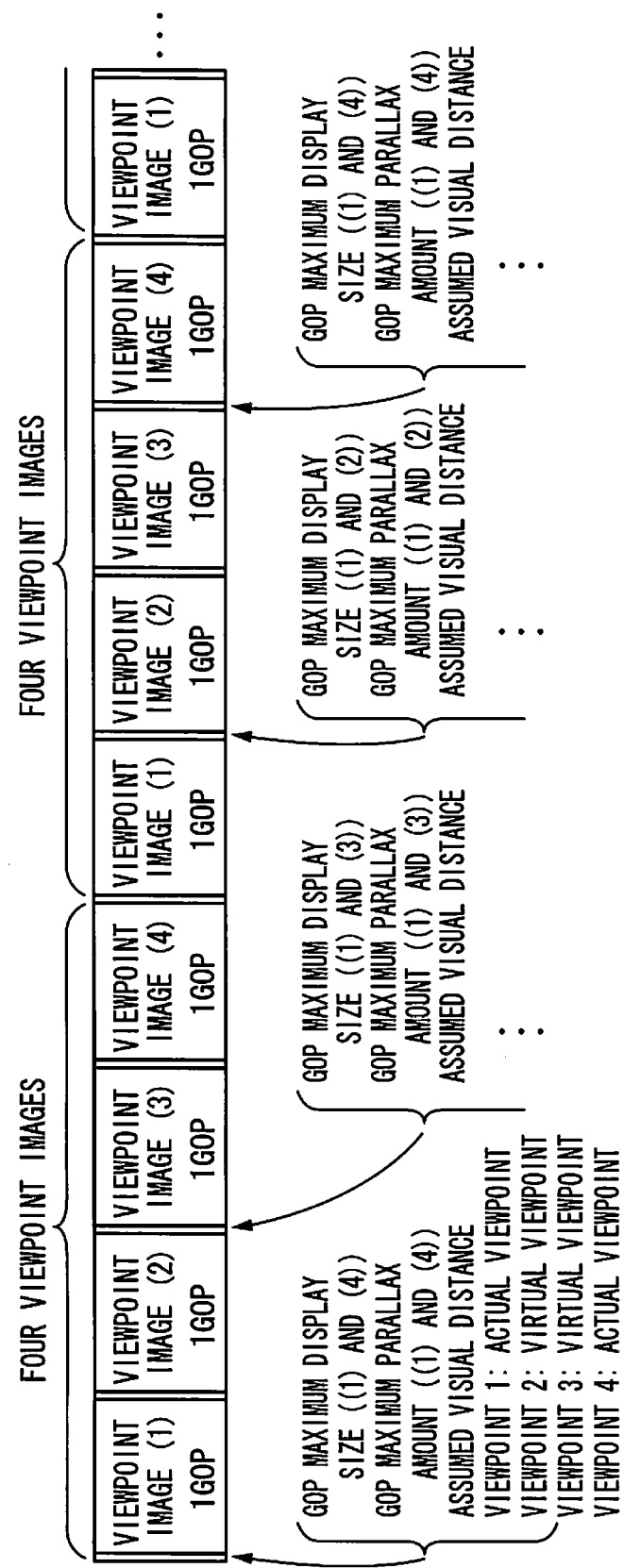
FIG. 9 is a diagram typically showing a data structure of a 3D video file in which viewpoint images at four viewpoints are recorded.

FIG. 9 is a diagram typically showing a data structure of a 3D video file recording viewpoint images at four viewpoints taken by these four imaging devices 101-1 to 101-4. Similar to the file illustrated in FIG. 2, this 3D video file is a MPEG file, and, regarding the viewpoint images at four viewpoints, in units of one GOP, viewpoint images (1) to (4) corresponding to viewpoint numbers 1 to 4 are sequentially and repeatedly coupled and faulted as one file.

Also, in the first header area of the record area in which each viewpoint image per GOP is recorded, similar to the first embodiment, attached information is recorded, such as the GOP maximum display size, the GOP maximum parallax amount, the assumed visual distance and the convergence angle, base line length and imaging unit arrangement (i.e. viewpoint number) of the device that takes each viewpoint image.

Also, as for the GOP maximum display size and the GOP maximum parallax amount or the like recorded in the head of each of the viewpoint images (1) to (4), values calculated between the viewpoint image and other viewpoint images are recorded. To be more specific, regarding the GOP maximum display size and GOP maximum parallax amount with respect to viewpoint image (1), on the basis of viewpoint image (1) taken at the left end reference viewpoint as illustrated in FIG. 8, for example, the GOP maximum parallax amount calculated from a viewpoint image with the largest parallax amount (viewpoint image (4) in this case) and the GOP maximum display size and assumed visual distance acquired from this maximum parallax amount are recorded. Even regarding the convergence angle and the base line length, the convergence angle and base line length of a device that takes the same viewpoint image (viewpoint image (4) in this case) are recorded.

As attached information of viewpoint image (2), for example, the GOP maximum display size, GOP maximum parallax amount, assumed visual distance, convergence angle, base line length and viewpoint number calculated from this viewpoint image (2) and viewpoint image (1) taken at the reference viewpoint are recorded.

As attached information of viewpoint image (3), for example, the GOP maximum display size, GOP maximum parallax amount, assumed visual distance, convergence angle, base line length and viewpoint number calculated from this viewpoint image (3) and viewpoint image (1) taken at the reference viewpoint are recorded.

As attached information of viewpoint image (4), for example, the GOP maximum display size, GOP maximum parallax amount, assumed visual distance, convergence angle, base line length and viewpoint number calculated from this viewpoint image (4) and viewpoint image (1) taken at the reference viewpoint are recorded.

Thus, a 3D video file recording viewpoint images at multiple viewpoints equal to or greater than three viewpoints is read by a stereoscopic video reproduction device when it is displayed on a 3D display. In this case, in the stereoscopic video reproduction device, by comparing the GOP maximum display size per viewpoint image recorded in attached information of the 3D video file and the display size of the 3D display on which it is to be displayed, it is possible to easily decide whether binocular vision is possible.

The recording order of multiple viewpoint images is not limited to the order illustrated in FIG. 9, and recommendation images (e.g. two viewpoint images) when it is displayed on the 3D display may be recorded earlier. For example, in a case where stereoscopic display by viewpoint images (2) and (3) at the two viewpoints in the center is recommended, viewpoint images (2) and (3) may be recorded earlier and viewpoint images (1) and (4) may be subsequently recorded, and, meanwhile, in a case where stereoscopic display by viewpoint images (1) and (4) at the two viewpoints at both ends is recommended, viewpoint images (1) and (4) may be recorded earlier and viewpoint images (2) and (3) may be subsequently recorded.

Fourth Embodiment of 3D Video File

All of the multiple viewpoint images as in the third embodiment need not be images that are actually taken, and a virtual viewpoint image corresponding to a virtual viewpoint may be included.

Figure 10:
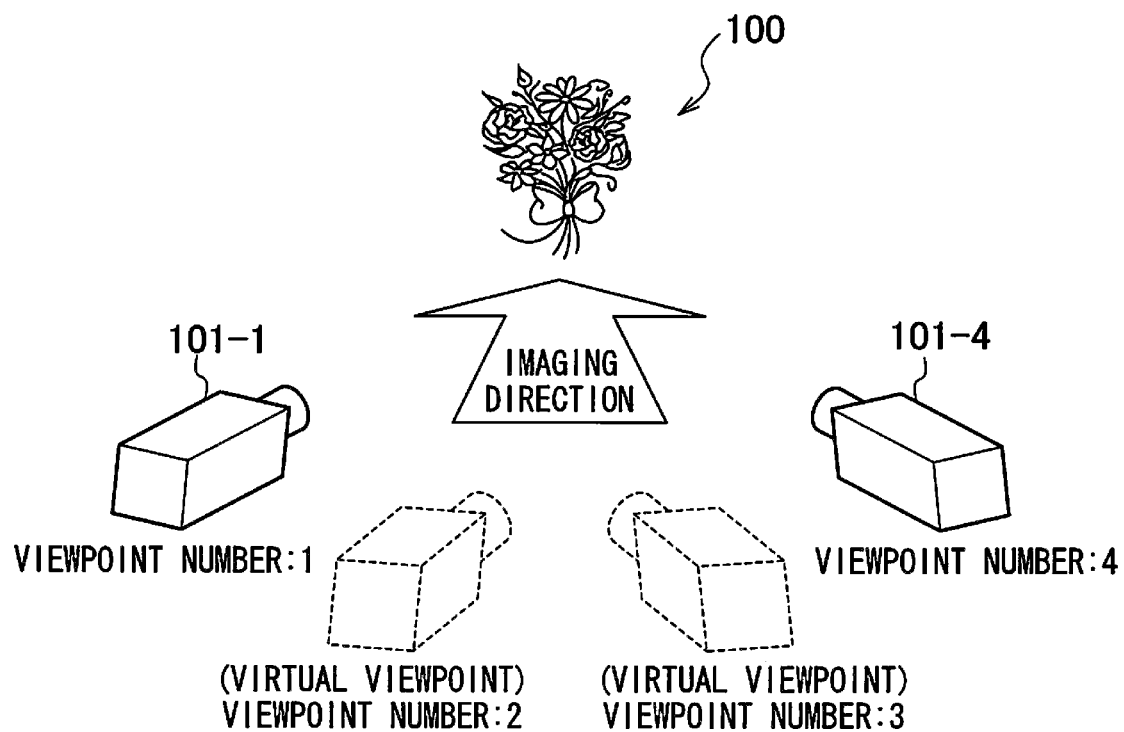
FIG. 10 is a diagram for explaining a virtual viewpoint.

For example, as illustrated in FIG. 10, two viewpoint images at different viewpoints (i.e. viewpoint number 1 and viewpoint number 4) with respect to the object 100 are taken by two imaging devices 101-1 and 101-4.

Further, it is possible to generate viewpoint images 2 and 3 of viewpoint numbers 2 and 3 at virtual viewpoints, which are different viewpoints from viewpoint numbers 1 and 4 and which are not actually present. To generate a virtual viewpoint image, there are a method of internally dividing each pixel of a plurality of taken images and a method of generating it using a parallax map generated from a plurality of taken images and one taken image, but it is not specifically limited.

In a 3D video file recording viewpoint images at multiple viewpoints including a viewpoint image at a virtual viewpoint, as attached information of first viewpoint image (1) among the viewpoint images at the multiple viewpoints, information indicating whether the viewpoint image at each viewpoint is the viewpoint image at an actual viewpoint or the viewpoint image at the virtual viewpoint, is collectively recorded (see FIG. 9). Here, it is not limited to a case where information of the actual viewpoint and the virtual viewpoint is collectively recorded as attached information of first viewpoint image (1), and, as the attached information of each of viewpoint images (1) to (4), information indicating whether it is the viewpoint image at the actual viewpoint or the viewpoint image at the virtual viewpoint may be individually recorded. This information indicating whether it is the viewpoint image at the actual viewpoint or the viewpoint image at the virtual viewpoint can be used in a case where a 3D video is displayed as a 2D video.

{Appearance of Stereoscopic Imaging Device}

Figure 11A:
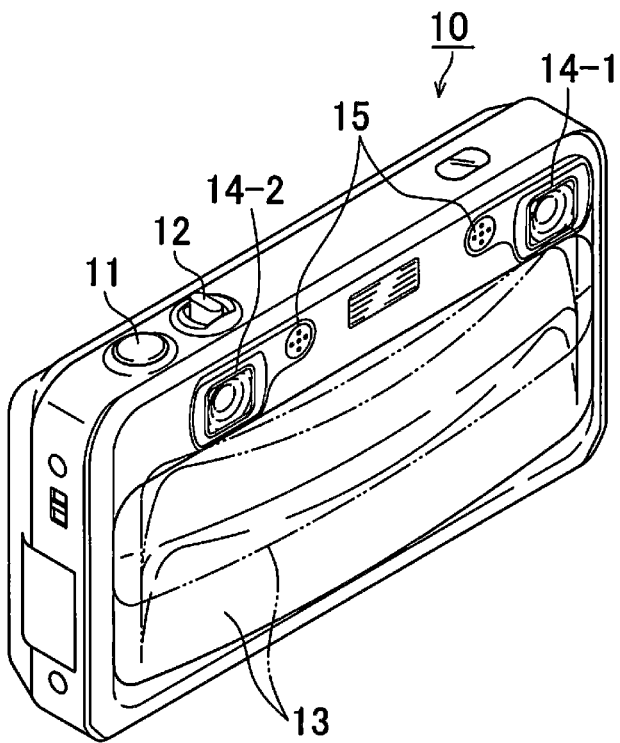
FIG. 11A is a diagram illustrating an appearance of a stereoscopic imaging device.
Figure 11B:
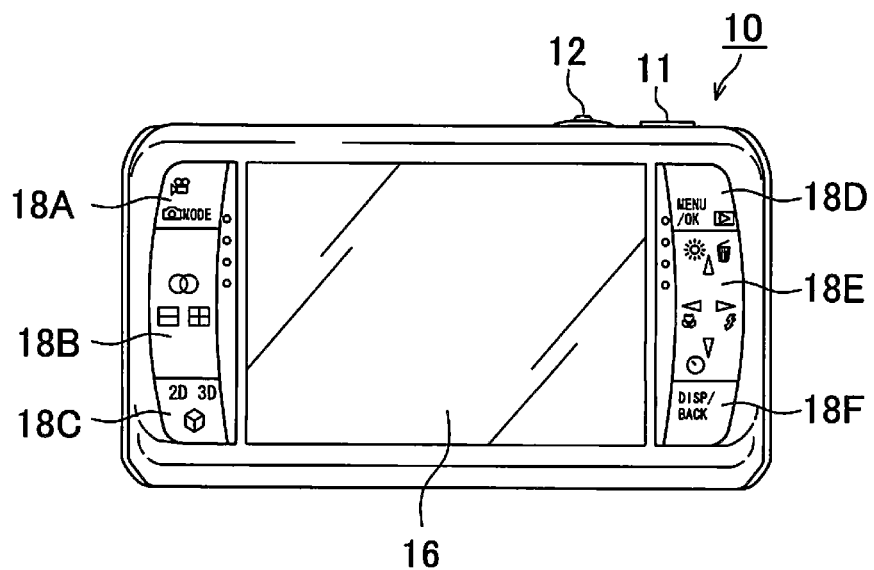
FIG. 11B is a diagram illustrating an appearance of a stereoscopic imaging device.

FIG. 11A and FIG. 11B are diagrams illustrating an appearance of a stereoscopic imaging device according to the present invention, FIG. 11A is a perspective view seen from the front surface side of the stereoscopic imaging device and FIG. 11B is a rear view.

This stereoscopic imaging device (i.e. compound eye camera) 10 is a digital camera that can record and reproduce 2D/3D still images and 2D/3D videos, and, as illustrated in FIG. 11A and FIG. 11B, a shutter button 11 and a zoom button 12 are provided on the upper surface of the thin camera body having a rectangular parallelepiped shape.

A lens barrier 13 having substantially the same width as the width in the horizontal direction of the camera body is provided in the front surface of the camera body so as to be freely moved in the vertical direction of the camera body, and, by moving this lens barrier 13 in the vertical direction between the position indicated by the alternate long and two dots lines and the position indicated by the solid lines, it is possible to open and close the front surfaces of a pair of right and left imaging optical systems 14-1 and 14-2 at the same time. Here, as the imaging optical systems 14-1 and 14-2, a zoom lens of folded optics is used. Also, in tandem with the opening and closing operation of the front surface of the lens by the lens barrier 13, it is possible to turn on or off the camera power supply.

As illustrated in FIG. 11B, a liquid crystal monitor 16 for 3D is provided in the center part of the back of the camera body. The liquid crystal monitor 16 can display a plurality of parallax images (i.e. right viewpoint image and left viewpoint image) as directivity images having predetermined directivities by a parallax barrier, respectively. Also, as the liquid crystal monitor 16 for 3D, it is possible to apply the one using a lenticular lens or the one in which it is possible to individually view the right viewpoint image and the left viewpoint image by wearing dedicated glasses such as polarized glasses and liquid crystal shutter glasses.

Various operation switches are provided on the right and left of the above liquid crystal monitor 16. An operation switch 18A is a switching switch to switch between the still image imaging and the video imaging, an operation switch 18B is a parallax adjustment switch to adjust the parallax amount between the right viewpoint image and the left viewpoint image, and an operation switch 18C is a switching switch to switch between the 2D imaging and the 3D imaging. Also, an operation switch 18D is a seesaw key combining a MENU/OK button and a reproduction button, an operation switch 18E is a multi-function arrow key and an operation switch 18F is a DISP/BACK key.

The MENU/OK button is an operation switch combining: a function as a menu button to give an instruction to display a menu on the screen of the liquid crystal monitor 16; and a function as an OK button to give an instruction to confirm and execute selection content. The reproduction button is a button to switch from an imaging mode to a reproduction mode. The arrow key is an operation switch to input an instruction for four directions of top, bottom, right and left, to which a macro button, a flash button and a self-timer button or the like are assigned. Here, in a case where a menu is selected, it functions as a switch (i.e. cursor movement operation unit) to select an item from the menu screen or give an instruction to select various setting items from each menu. Also, the left/right key of the arrow key functions as a button for frame feeding (forward direction/backward direction feeding) in a reproduction mode. The DISP/BACK key is used at the time of switching a display format of the liquid crystal monitor 16, cancelling instruction content on the menu screen or returning to the previous operation state.

Also, reference numeral "15" is a stereo microphone in FIG. 11A.

{Internal Structure of Stereoscopic Imaging Device}

Figure 12:
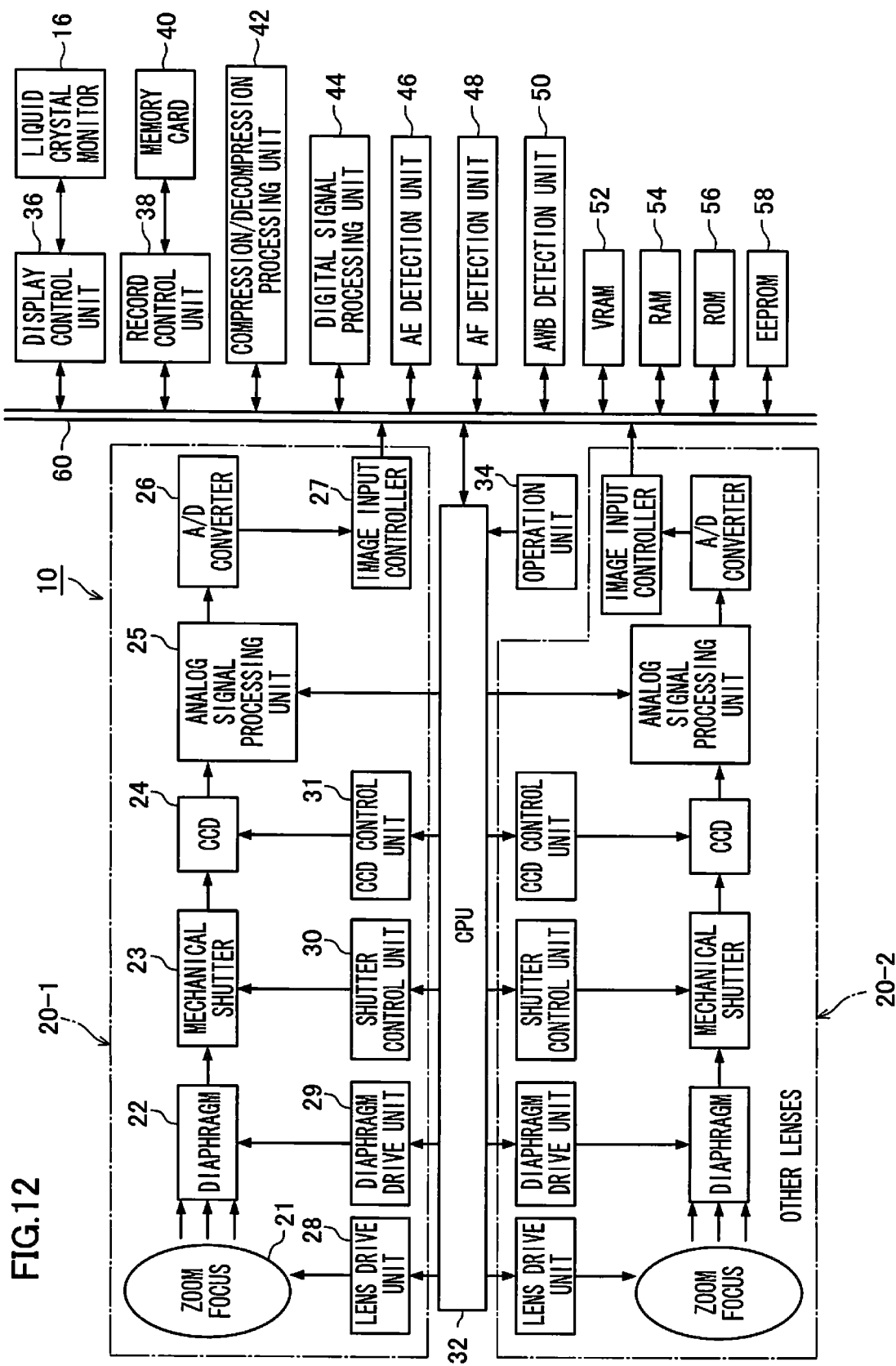
FIG. 12 is a block diagram illustrating an internal structure of a stereoscopic imaging device.

FIG. 12 is a block diagram indicating an internal structure of the above stereoscopic imaging device 10.

As illustrated in FIG. 12, this stereoscopic imaging device 10 is formed mainly of: a plurality of imaging units 20-1 and 20-2; a central processing unit (CPU) 32; an operation unit 34 including the above shutter button 11, the zoom button 12 and various operation switches; a display control unit 36; the liquid crystal monitor 16, a record control unit 38; a compression/decompression processing unit 42; a digital signal processing unit 44; an AE (Automatic Exposure) detection unit 46; an AF (Auto Focus) detection unit 48; an AWB (Automatic White Balance) detection unit 50; a VRAM 52; a RAM 54, a ROM 56; and an EEPROM 58. Here, although the imaging units 20-1 and 20-2 take two parallax images of the left eye image and right eye image with parallax therebetween, there may be three or more imaging units 20.

The imaging unit 20-1 that takes a left eye image includes: a prism (not illustrated); an imaging optical system 14-1 (FIG. 14) formed with a focus lens and a zoom lens 21; an optical unit formed with a diaphragm 22 and a mechanical shutter 23; a solid-state imaging element (CCD) 24; an analog signal processing unit 25; an A/D converter 26; an image input controller 27; a lens drive unit 28 that drives the above optical unit; a diaphragm drive unit 29; a shutter control unit 30; and a CCD control unit 31 that controls the CCD 24. Also, the imaging unit 20-2 that takes a right eye image has the same structure as the imaging unit 20-1 that takes the above left eye image, explanation of the specific structure is omitted.

The CPU 32 performs integration control of the overall camera operation according to a predetermined control program based on an input from the operation unit 34. Further, the CPU 32 calculates the parallax amount by feature point extraction, acquires the maximum parallax amount, calculates the GOP maximum display size, calculates the scene maximum display size, calculates the GOP maximum parallax amount, calculates the scene maximum parallax amount, detects the scene change, performs parallax shift and generates a virtual viewpoint image, and so on.

Also, the ROM 56 stores a control program executed by the CPU 32, various kinds of data required for control, a 3D video processing program and a 3D video reproduction program or the like. The EEPROM 58 stores various kinds of information indicating an adjustment result at the time of adjustment before the product is shipped, such as pixel defect information of the CCD 24, correction parameters used for image processing and the like, and a correspondence table between the maximum parallax amount, and the maximum display size.

Also, the VRAM 52 is a memory that temporarily stores display image data displayed on the liquid crystal monitor 16, and the RAM 54 contains a computation work area of the CPU 32 and a temporary storage area of image data.

The focus lens and the zoom lens 21 included in the imaging optical system are driven by the lens drive unit 28 and moved back and forth along the optical axis. By controlling the drive of the lens drive unit 28, the CPU 32 controls the position of the focus lens and performs focus adjustment such that the object is focused on, and changes the zoom magnification by controlling the zoom position of the zoom lens according to a zoom instruction from the zoom button 12 in the operation unit 34.

For example, the diaphragm 22 is formed with an iris diaphragm, and is driven and operated by the diaphragm drive unit 29. The CPU 32 controls the aperture amount (i.e. diaphragm value) of the diaphragm 22 through the diaphragm drive unit 29, and controls the incident light amount to the CCD 24.

The mechanical shutter 23 decides the exposure time in the CCD 24 by opening and closing the optical path, and prevents smear from being caused such that unnecessary light is not incident on the CCD 24 at the time of reading a video signal from the CCD 24. The CPU 32 outputs a shutter close signal synchronized with the exposure end timing corresponding to the shutter speed, to the shutter control unit 30, and controls the mechanical shutter 23.

The CCD 24 is formed with a two-dimensional color CCD solid-state imaging element. On the light receiving side of the CCD 24, many photodiodes are arrayed in a two-dimensional manner, and, in each photodiode, a color filter is arranged in a predetermined array.

An object optical image formed on the CCD light receiving side through the optical unit having the above structure is converted into a signal electric charge corresponding to the incident light amount by this photodiode. The signal electric charge accumulated in each photodiode is sequentially read from the CCD 24 as a voltage signal (or image signal) corresponding to the signal electric charge, based on a drive pulse given from the CCD control unit 31 according to an instruction of the CPU 32. The CCD 24 includes an electronic shutter function and controls the exposure time (or shutter speed) by controlling the electric charge accumulation time for the photodiode. Here, the electric charge accumulation start timing corresponding to the shutter speed is controlled by the electronic shutter, and the exposure end timing (i.e. electric charge accumulation end timing) is controlled by closing the mechanical shutter 23. In this embodiment, although the CCD 24 is used as an imaging element, it is possible to use an imaging element of another structure such as a CMOS sensor.

After analog signals of R, G and B read from the CCD 24 are subjected to correlated double sampling (CDS) and amplification in the analog signal processing unit 25, they are converted into digital signals of R, G and B in the A/D converter 26.

The image input controller 27 incorporates a line buffer of predetermined capacity, and, after temporarily accumulating the image signals of R, G and B (i.e. CCDRAW data) subjected to A/D conversion in the A/D converter 26, stores them in the RAM 54 through a bus 60.

The CPU 32 controls the imaging unit 20-2 that takes a right viewpoint image as well as the imaging unit 20-1 that takes a left viewpoint image, in a 3D imaging mode.

The AE detection unit 46 calculates the object luminance required for AE control based on a video signal imported at the time of a half push of the shutter button 11, and outputs a signal indicating the object luminance (i.e. imaging EV value) to the CPU 32. The CPU 32 sets the shutter speed (i.e. exposure time), diaphragm value and imaging sensitivity in a plurality of imaging units 20-1 and 20-2, according to a predetermined program diagram based on the input imaging EV value.

The AF detection unit 48 integrates the absolute value of the high-frequency component of an image signal of an AF area imported at the time of a half push of the shutter button 11, and outputs this integrated value (i.e. AF evaluation value) to the CPU 32. The CPU 32 moves the focus lens from the near side to the infinity side, searches for the focusing position in which the AF evaluation value detected by the AF detection unit 48 is the maximum, and, by moving the focus lens to the focusing position, performs focus adjustment to the object (i.e. main object). Also, at the time of taking videos, so-called mountaineering control is performed to move the focus lens such that the above AF evaluation value always has the maximum value.

The AWB detection unit 50 automatically finds the light source type (color temperature of the field) based on image signals of R, G and B acquired at the time of the imaging, and reads the corresponding white balance gain from a table storing the white balance gains (i.e. white balance correction values) of R, G and B which are set in advance for respective light source types.

The digital signal processing unit 44 includes: a white balance correction circuit; a gray scale conversion processing circuit (e.g. gamma correction circuit); a synchronization circuit that compensates for a spatial gap of color signals such as R, G and B according to a color filter array of a single panel CCD and aligns the position of each color signal; a contour correction circuit; and a luminance and color difference signal generation circuit, and so on, and performs image processing on the image signals (i.e. CCDRAW data) of R, G and B stored in the RAM 54. That is, in the digital signal processing unit 44, the CCDRAW data of R, G and B is multiplied by the white balance gain detected in the AWB detection unit 50, subjected to white balance correction, and, after predetermined processing such as gray scale conversion processing (e.g. gamma correction) is subsequently performed, converted into a YC signal formed with the luminance signal (Y signal) and the color difference signal (Cr and Cb signals). The YC signal processed by the digital signal processing unit 44 is stored in the RAM 54.

Also, the digital signal processing unit 44 includes: a distortion correction circuit that corrects lens distortion in the imaging optical systems of the plurality of imaging units 20-1 and 20-2; and an image extraction processing circuit that corrects the optical axis shift of the imaging optical systems of the plurality of imaging units 20-1 and 20-2 by extracting an image of a predetermined extraction area from the right and left viewpoint images respectively.

The compression/decompression processing unit 42 performs compression processing on the YC signal stored in the RAM 54 according to an instruction from the CPU 32 at the time of recording in the memory card 40, and performs decompression processing on the compressed compression data recorded in the memory card 40 and produces the YC signal.

The record control unit 38 records the compression data compressed by the compression/decompression processing unit 42 in the memory card 40 as a predetermined format image file (e.g. records a 3D still image as an MP file and a 3D video as a video file of MPEG4, MPEG4-MVC, motion JPEG or H.264), or reads the video file from the memory card 40.

Also, when a 3D video file according to the present invention is recorded, as explained in the first embodiment to the fourth embodiment, in addition to attached information such as the image size, the aspect ratio and the frame rate, the record control unit 38 records, as attached information in the memory card 40: the GOP maximum display size; the scene maximum display size; the assumed visual distance; the GOP maximum parallax amount (near view) (%); the GOP maximum parallax amount (distant view) (%); the scene maximum parallax amount (near view) (%), and the scene maximum parallax amount (distant view) (%).

In this case, at the time of taking a 3D video, in addition to a case where a 3D video file is created and recorded as explained in the first embodiment to the fourth embodiment, a case is possible where it is temporarily recorded as a normal 3D video file in the memory card 40, and, after that, the 3D video file is read from the memory card 40 to create the 3D video file explained in the first embodiment to the fourth embodiment and record it in the memory card 40 again.

The liquid crystal monitor 16 is used as an image display unit to display a taken image, and is used as a GUI (Graphical User Interface) at the time of various settings. Further, the liquid crystal monitor 16 is used as an electronic viewfinder that displays a live view image (hereafter referred to as "through image") to confirm the angle of view in an imaging mode. In a case where a 3D video is displayed on the liquid crystal monitor 16, the display control unit 36 alternately displays the left viewpoint image and right viewpoint image held in the VRAM 52 one pixel by one pixel. By the parallax barrier provided in the liquid crystal monitor 16, the right and left eyes of the user who observes the monitor from a predetermined distance individually have visual contact with the right and left images that are alternately arrayed one pixel by one pixel. By this means, binocular vision is possible.

By the stereoscopic imaging device 10 configured as above, it is possible to realize the above embodiments. Here, although the stereoscopic imaging device 10 explained herein includes two imaging units to take images at two right and left viewpoints, it may be configured to include three or more imaging units and take viewpoint images at three or more points. For example, as illustrated in FIG. 8, it may be configured such that, by including four imaging units such as four imaging devices 101-1 to 101-4, viewpoint images at four viewpoints are taken.

First Embodiment of 3D Video Reproduction

Figure 13:
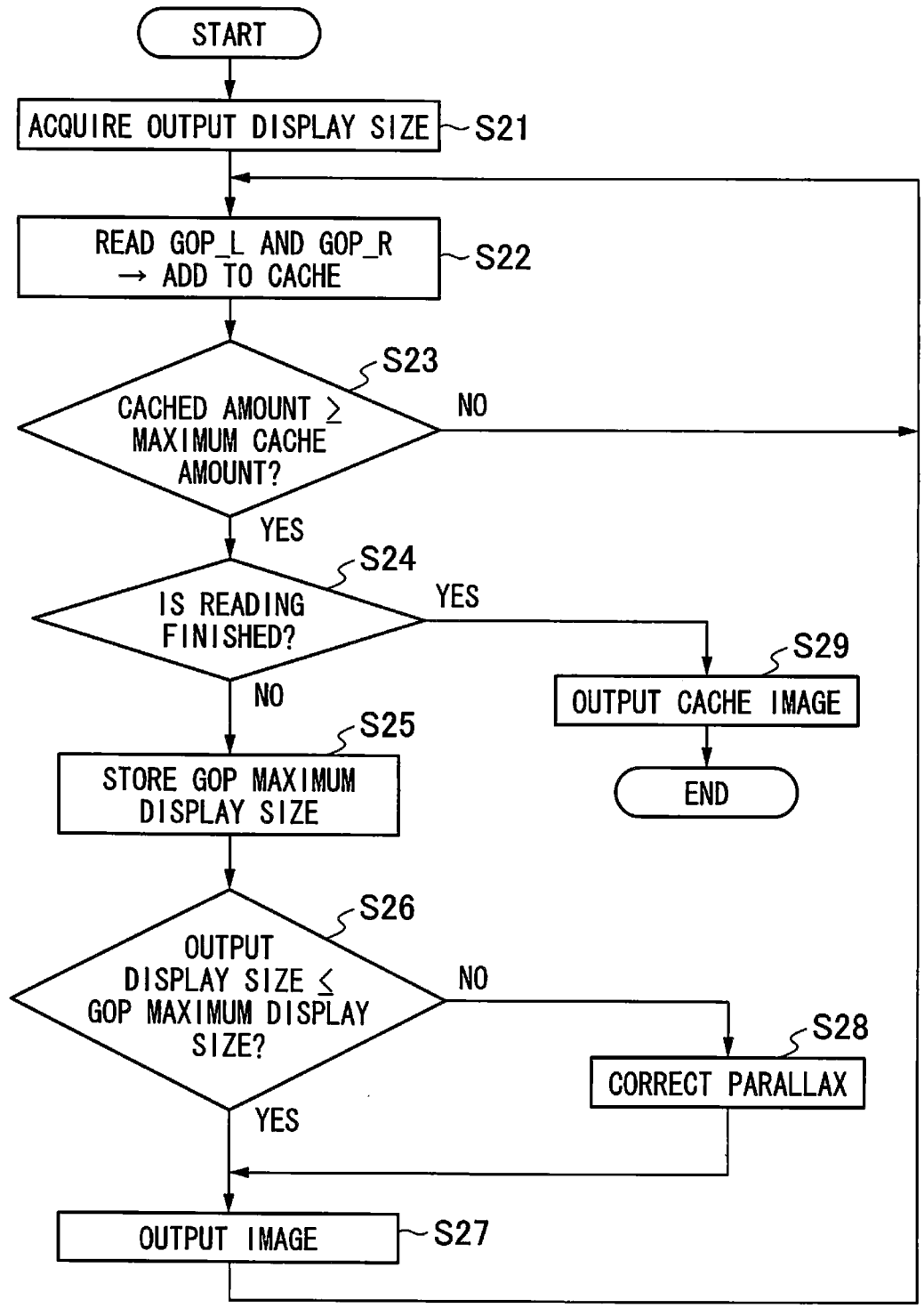
FIG. 13 is a flowchart illustrating the first embodiment of 3D video reproduction.

Next, using the flowchart in FIG. 13, an explanation is given to processing of reading a 3D video file recorded as above and performing 3D video reproduction.

First, the output display size of a 3D display of the output destination to display a 3D video is acquired (step S21). This output display size can be acquired from an HDMI terminal of the 3D display. Subsequently, GOP_L of a left viewpoint and GOP_R of a right viewpoint are read from the 3D video file, these are held in a cache (step S22), and GOP_L of the left viewpoint and GOP_R of the right viewpoint are added to the cache until the cached amount reaches a predetermined maximum cache amount (step S23).

When the cached amount reaches the predetermined maximum cache amount, it is decided whether the reading of GOP_L of all left viewpoints and GOP_R of all right viewpoints in the 3D video file is finished (step S24), and, in a case where the reading is not finished (in the case of "NO"), the GOP maximum display size is read from attached information of GOP_L of the left viewpoint and GOP_R of the right viewpoint, which are to be output to the 3D display, among cached GOP_L of left viewpoints and GOP_R of right viewpoints, and temporarily stored (step S25). Subsequently, the width of the output display size acquired in step S21 and the width of the GOP maximum display size stored in step S25 are compared (step S26).

When the width of the GOP maximum display size is equal to or greater than the width of the output display size, there is no problem for binocular vision even if GOP_L of the left viewpoint and GOP_R of the right viewpoint are displayed as is, and therefore GOP_L of the left viewpoint and GOP_R of the right viewpoint are output as is to the 3D display (step S27).

By contrast, in a case where the width of the output display size is greater than the width of the GOP maximum display size, if GOP_L of the left viewpoint and GOP_R of the right viewpoint with the GOP maximum display size as attached information are displayed, the parallax amount at the maximum parallax position on the distant view side exceeds man's binocular interval and that part cannot be stereoscopically viewed. Therefore, it is necessary to correct the parallax amount of the right and left viewpoint images.

The parallax amount correction is performed by parallax shift (step S28).

FIG. 14 is a diagram for explaining the principle of the parallax shift. Also, (a) portion of FIG. 15 is a diagram illustrating the left viewpoint image and (b) portion of FIG. 15 is a diagram illustrating the right viewpoint image. Here, it is assumed that the left eye of the viewer is on coordinate (0,D) and the right eye of the viewer is on coordinate $(X_B, D)$. In the right and left viewpoint images displayed on Z=0, the object displayed on coordinate $(X_L, 0)$ of the left viewpoint image and coordinate $(X_R, 0)$ of the right viewpoint image is visually checked as being in coordinate $(X_P, Y_P)$.

In this state, as illustrated in (b) portion of FIG. 15, if the right viewpoint image is shifted only by $X_R - X_R'$ in the left direction, the coordinate of the right viewpoint image of the object becomes $(X_R', 0)$ as illustrated in FIG. 10, and, as a result, the object is visually checked as being in coordinate $(X_P', Y_P')$.

Thus, by performing parallax shift, it is possible to adjust the parallax amount. Therefore, in a case where the parallax amount on the distant view side exceeds man's binocular interval, it is possible to set the parallax amount within the man's binocular interval by performing parallax shift and appropriately perform binocular vision.

To be more specific, when the width of the output display size is W1, the width of the GOP maximum display size is W2 and the GOP maximum parallax amount is P, GOP maximum parallax amount after parallax correction P' is set to the following equation.

$$P' = \{W2/W1\} * P \qquad \{\text{Equation 1}\}$$

Therefore, by performing pixel shift on one or both of the right and left viewpoint images in the approaching direction only by the parallax amount (%) shown in the following equation, the parallax on the 3D display for a 3D video in one GOP can be set within man's binocular interval.

$$\text{Parallax amount (\%)} = P - P' \qquad \{\text{Equation 2}\}$$

Also, parallax correction is not limited to the above parallax shift but may be performed by parallax compression. As explained using FIG. 10, the parallax compression can be performed by generating an image at a virtual viewpoint with a smaller parallax amount than right and left viewpoint images and displaying the generated image at the virtual viewpoint. Which way is adopted to correct the parallax amount may be decided in advance or configured such that the user can select it. At least the parallax on the distant view side can be reduced by any parallax amount adjustment.

GOP_L of the left viewpoint and GOP_R of the right viewpoint subjected to parallax correction in above step S28 are output to the 3D display (step S27).

Thus, it is possible to always display an appropriate 3D video by: reading the GOP maximum display size recorded as attached information; comparing it with the output display size; outputting GOP_L of the left viewpoint and GOP_R of the right viewpoint as is to the 3D display with an assumption that there is no problem for binocular vision in a case where the GOP maximum display size is larger; and outputting GOP_L of the left viewpoint and GOP_R of the right viewpoint subjected to parallax correction with respect to all frames of GOP_L of the left viewpoint and GOPR of the right viewpoint with a determination that there is an area in which the binocular vision is impossible in a case where the output display size is larger.

In parallel with an output of above GOP_L of the left viewpoint and GOP_R of the right viewpoint to the 3D display, by reading and adding GOP_L of a new left viewpoint and GOP_R of a new right viewpoint into a cache, it is possible to reproduce the 3D video by performing the above processing.

In step S24, when the reading of GOP_L of all left viewpoints and GOP_R of all right viewpoints in the 3D video is finished ("in the case of YES"), GOP_L of the left viewpoint and GOP_R of the right viewpoint in the cache are output to the 3D display (step S29), and reproduction of the 3D video is ended. Here, even when GOP_L of the left viewpoint and GOP_R of the right viewpoint in the cache are output to the 3D display, the processing in steps S25 to S28 is performed.

In this embodiment, although the GOP maximum display size recorded in attached information of a 3D video file is used to decide whether the stereoscopic video of each GOP displayed on a 3D display of output destination can be stereoscopically viewed, it is not limited to this and it can be similarly performed even by using the GOP maximum parallax amount.

That is, an allowable parallax amount is calculated based on the display size of the 3D display of output destination and a predetermined value (e.g. 50 mm) indicating man's binocular interval. The allowable parallax amount is expressed by (man's binocular interval)/(display size) (%), and, in a case where the man's binocular interval is 50 mm and the display size (i.e. width) is 1300 mm, the allowable parallax amount is 3.85(%).

Also, depending on whether the GOP maximum parallax amount (%) is equal to or less than the above allowable parallax amount, it is possible to decide whether binocular fusion is possible.

Also, as another method, it is possible to calculate the image shift amount corresponding to the GOP maximum parallax amount on the 3D display based on both the GOP maximum parallax amount and the display size of the 3D display of output destination, and, depending on whether this calculated image shift amount exceeds a predetermined value indicating man's binocular interval, decide whether binocular fusion is possible.

Also, in the first embodiment, although parallax correction can be performed every one GOP, it is not limited to this, and the parallax correction may be performed based on the maximum display size and the maximum parallax amount or the like in a predetermined number of GOPs every predetermined number of GOPs set in advance.

Second Embodiment of 3D Video Reproduction

Figure 16:
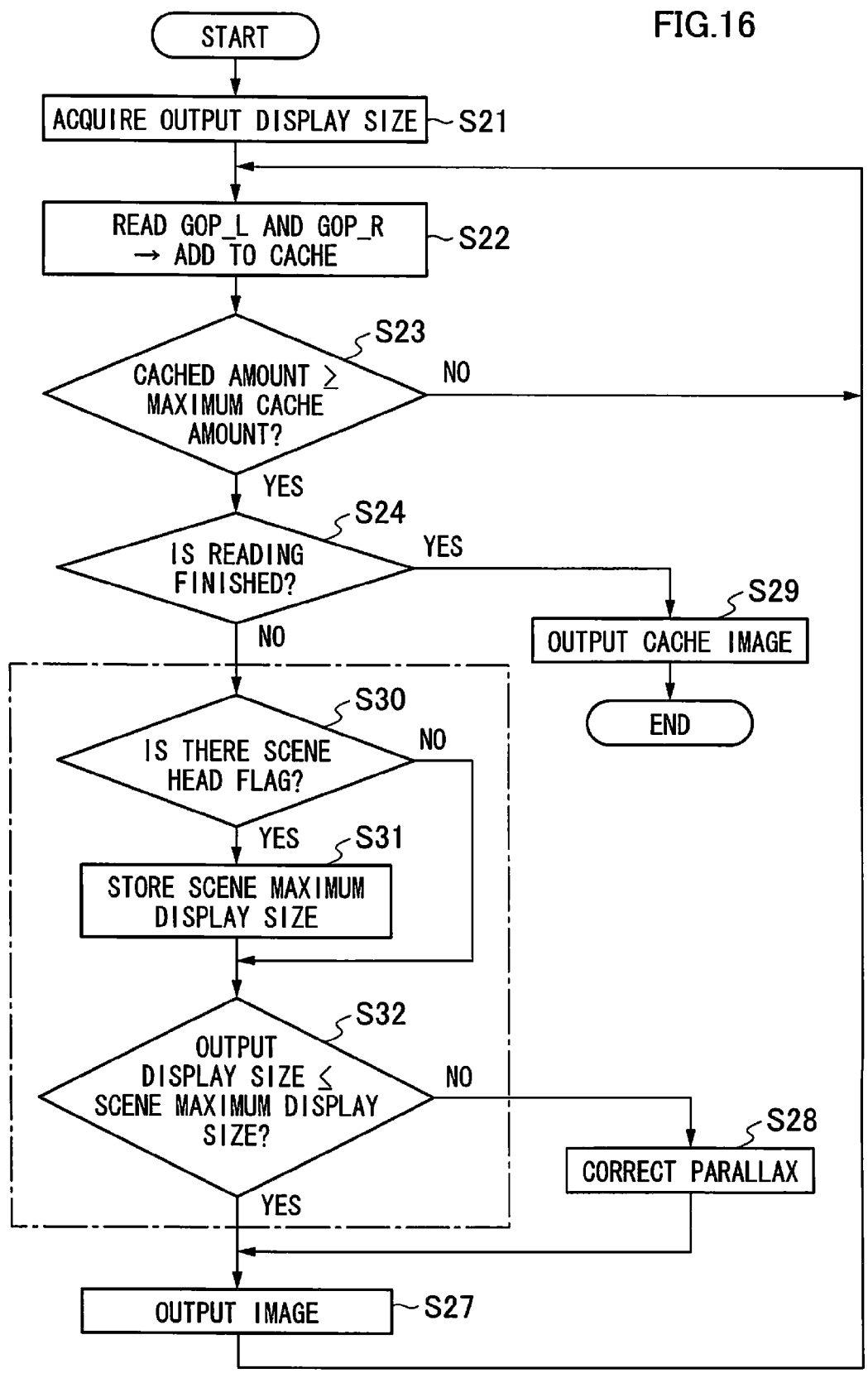
FIG. 16 is a flowchart illustrating the second embodiment of 3D video reproduction.

FIG. 16 is a flowchart indicating the second embodiment of 3D video reproduction processing. Here, the same step numbers are assigned to the common parts with the first embodiment illustrated in FIG. 13 and their detailed explanations are omitted.

Although the first embodiment targets a 3D video file in which the GOP maximum display size and the GOP maximum parallax amount are recorded as attached information every one GOP, the second embodiment is different from it in targeting a 3D video file in which the scene maximum display size and the scene maximum parallax amount are recorded as attached information every scene as illustrated in FIG. 7.

In FIG. 16, step S30 decides whether there is a scene head flag. When the scene head flag is detected ("in the case of YES"), the scene maximum display size is read from the first header of the scene and temporarily stored (step S31). Subsequently, the width of the output display size acquired in step S21 and the width of the scene maximum display size stored in step S31 are compared (step S32).

In a case where the width of the scene maximum display size is equal to or greater than the width of the output display size, since there is no problem for binocular vision even if the 3D video in the scene is displayed, it is output as is to the 3D display (step S27).

By contrast, in a case where the width of the output display size is greater than the width of the scene maximum display size ("in the case of NO" in step S32), the parallax of the 3D video in the scene is corrected such that the parallax of the 3D video in the scene on the 3D display is set within man's binocular interval.

Here, using the scene maximum parallax amount instead of the scene maximum display size, it may be decided whether it is possible to stereoscopically view the 3D video of the scene.

Third Embodiment of 3D Video Reproduction

Figure 17:
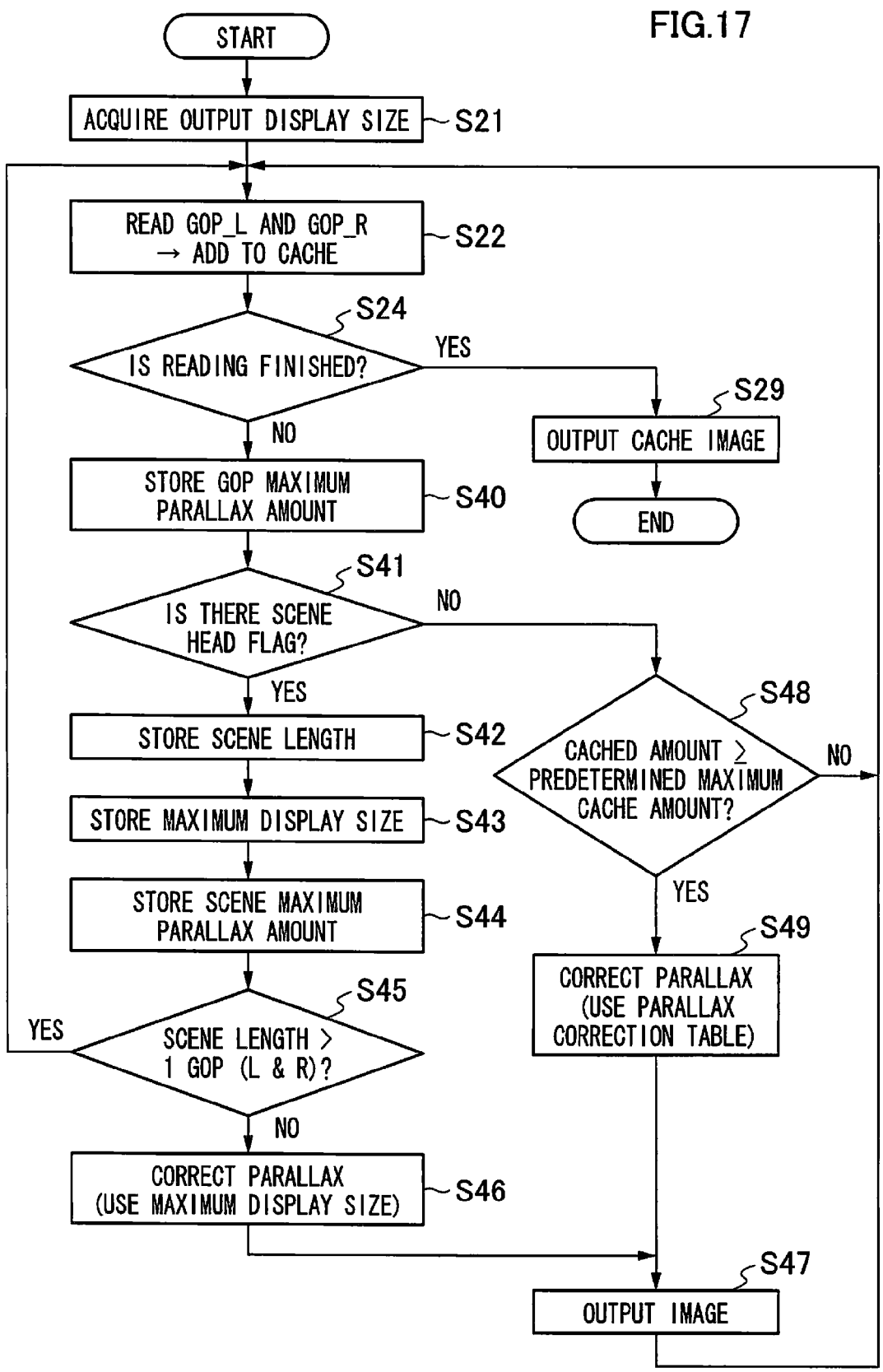
FIG. 17 is a flowchart illustrating the third embodiment of 3D video reproduction.

FIG. 17 is a flowchart illustrating the third embodiment of 3D video reproduction processing. Here, the same step numbers are assigned to the common parts with the first embodiment illustrated in FIG. 13 and their detailed explanations are omitted.

Although the first embodiment targets a 3D video file in which the GOP maximum display size and the GOP maximum parallax amount are recorded as attached information every one GOP, the third embodiment is different from it in targeting a 3D video file in which the GOP maximum display size and the GOP maximum parallax amount are recorded as attached information every one GOP and the scene maximum display size and the scene maximum parallax amount are recorded as attached information every scene as illustrated in FIG. 17.

In FIG. 17, in step S40, the GOP maximum parallax amount is read from attached information of cached GOP_L of the left viewpoint and GOP_R of the right viewpoint and temporarily stored. In step S41, it is decided whether there is a scene head flag. When the scene head flag is detected ("in the case of YES"), the scene length, the scene maximum display size and the scene maximum parallax amount are read from the first header of the scene and temporarily stored (steps S42, S43 and S45).

Subsequently, it is decided whether the scene length stored in step S42 is sufficiently longer than one GOP (step S45). When it is decided to be shorter ("in the case of NO"), in the same way as in the first embodiment, parallax correction is performed every one GOP (step S46) and GOP_L of the left viewpoint and GOP_R of the right viewpoint subjected to the parallax correction are output to the 3D display (step S47). Here, in a case where the maximum display size in the GOP is equal to or greater than the output display size, they are output as is to the 3D display without performing the parallax correction.

Meanwhile, in step 45, when the scene length is decided to be longer ("in the case of YES"), it returns to step S22, and thereafter, through the processing in step S41 and step S48, GOP_L of a left viewpoint and GOP_R of a right viewpoint are cached until it reaches a predetermined maximum cache amount from the scene head.

Subsequently, when the cached amount reaches the predetermined maximum cache amount (i.e. when it is decided as "in the case of YES" in step S48), parallax correction with respect to the 3D video in the scene is performed using the following parallax correction tables (step S49).

Figure 18:
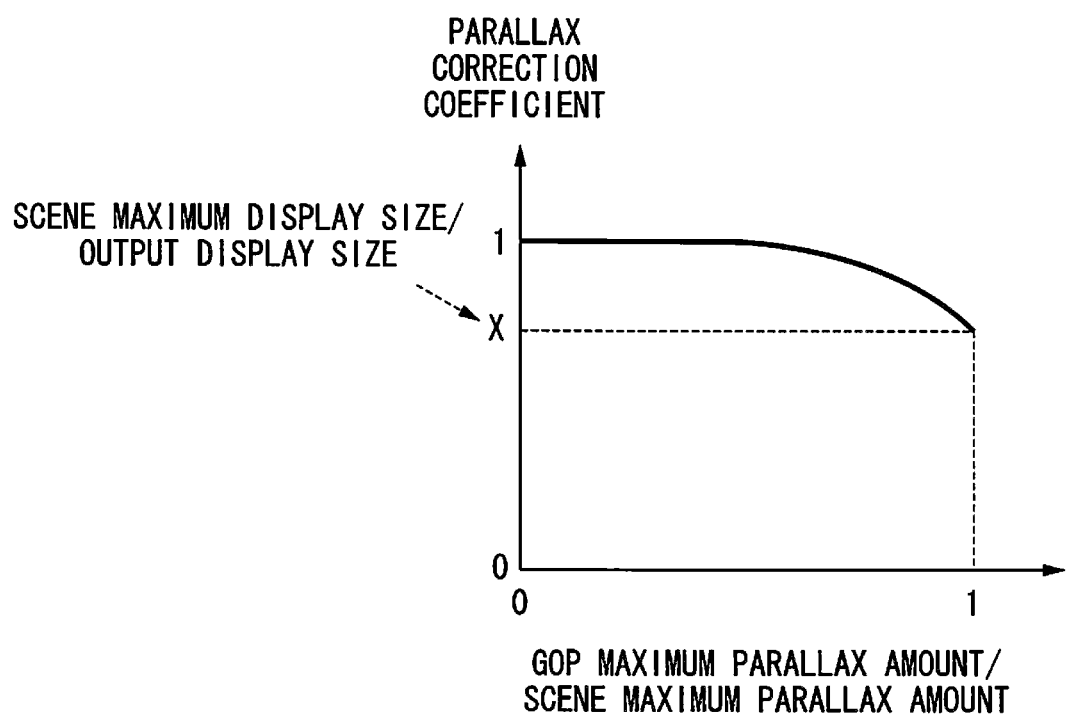
FIG. 18 is a graph illustrating an example of a parallax correction table.

FIG. 18 is a graph illustrating an example of the parallax correction table. In the graph illustrated in FIG. 18, the horizontal axis indicates the GOP maximum parallax amount/scene maximum parallax amount, and the vertical axis indicates a parallax correction coefficient (0 to 1).

Here, when it is assumed that the ratio of the scene maximum display size stored in step S43 to the output display size acquired in step S21 (i.e. scene maximum display size/output display size) is X, the parallax correction coefficient is set to a value that changes from 1 to X as the GOP maximum parallax amount/scene maximum parallax amount approaches 1 from 0.

Here, the parallax correction coefficient is multiplied by each GOP maximum parallax amount in the scene. The parallax correction is performed such that each GOP maximum parallax amount in the scene is set to the above multiplied value (i.e. corrected GOP maximum parallax amount).

For example, GOP_L of the left viewpoint and GOP_R of the right viewpoint with the GOP maximum parallax amount corresponding to "GOP maximum parallax amount/scene maximum parallax amount=1" as attached information are subjected to parallax shift so as to provide the GOP maximum parallax amount P' after parallax correction illustrated above in {Equation 1} (i.e. parallax shift by the parallax amount illustrated in {Equation 2}), and, by this means, it is possible to set the parallax of the 3D video in the GOP on the 3D display within man's binocular interval.

Meanwhile, even regarding GOP_L of the left viewpoint and GOPR of the right viewpoint with the GOP maximum parallax amount less than "GOP maximum parallax amount/scene maximum parallax amount=1," the parallax correction coefficient is determined such that parallax correction is performed based on the degree of the GOP maximum parallax amount.

In step S49, by performing the parallax correction using the above parallax correction table, the parallax correction is performed such that the parallax amount is gradually decreased as the maximum parallax amount in each GOP becomes closer to the maximum parallax amount in the scene (i.e. scene maximum parallax amount), while the parallax decrement is reduced (or made closer to the original) as it becomes more distant from the maximum parallax amount in the scene.

GOP_L of the left viewpoint and GOP_R of the right viewpoint subjected to parallax correction in above step S49 are output to the 3D display (step S47). In a case where the scene maximum display size is equal to or greater than the output display size (i.e. in a case where there is no problem in 3D display), the above parallax correction is not performed, and GOP_L of the left viewpoint and GOP_R of the right viewpoint without the parallax correction are output to the 3D display.

By the above parallax correction, even if there is a parallax as a problem in 3D display in a partial GOP in a scene, it is possible to prevent other GOP parallaxes from being subjected to parallax correction uniformly, suppress an excessive parallax and ensure the stereoscopic feeling in the whole scene.

Also, in the first embodiment to the third embodiment of 3D video reproduction described above, the parallax shift processing may be performed taking into consideration the maximum parallax amount (near view).

That is, in a case where the parallax amount on the distant view side becomes excessive and binocular fusion is impossible, when parallax shift is performed by the calculated necessary shift amount, the parallax amount on the near view side accordingly increases. Therefore, the necessary shift amount is added to the product of the display size (i.e. width) of the 3D display of output destination and the maximum parallax amount (near view), and it is decided whether the resulting value is equal to or less than a binocular interval (e.g. 50 mm) Here, it is decided that binocular vision is adequately possible in a case where the parallax amount in the near view is 50 mm or less, but, this value of 50 mm may be adequately determined.

Subsequently, parallax shift is implemented in a case where the parallax amount is 50 mm or less, and viewpoint images at two viewpoints subjected to the parallax shift are stereoscopically displayed on the 3D display. By contrast, in a case where it is greater than 50 mm, there is a part in which binocular vision is impossible on the distant view side unless parallax shift is performed, and, since appropriate binocular vision on the near view side is not possible if the parallax shift is performed such that the maximum parallax amount on the distant view side becomes appropriate, 2D display is performed on the 3D display instead of 3D display. This 2D display is performed by outputting one of the viewpoint images recorded in the 3D video file to the 3D display. Also, together with the 2D display, warning display may be performed to show that the 3D video is not stereoscopically displayed since the display size is too large.

Thus, by adjusting the parallax amount taking into consideration not only the maximum parallax amount (distant view) but also the maximum parallax amount (near view), it is possible to display an appropriate 3D video.

Fourth Embodiment of 3D Video Reproduction

Figure 19:
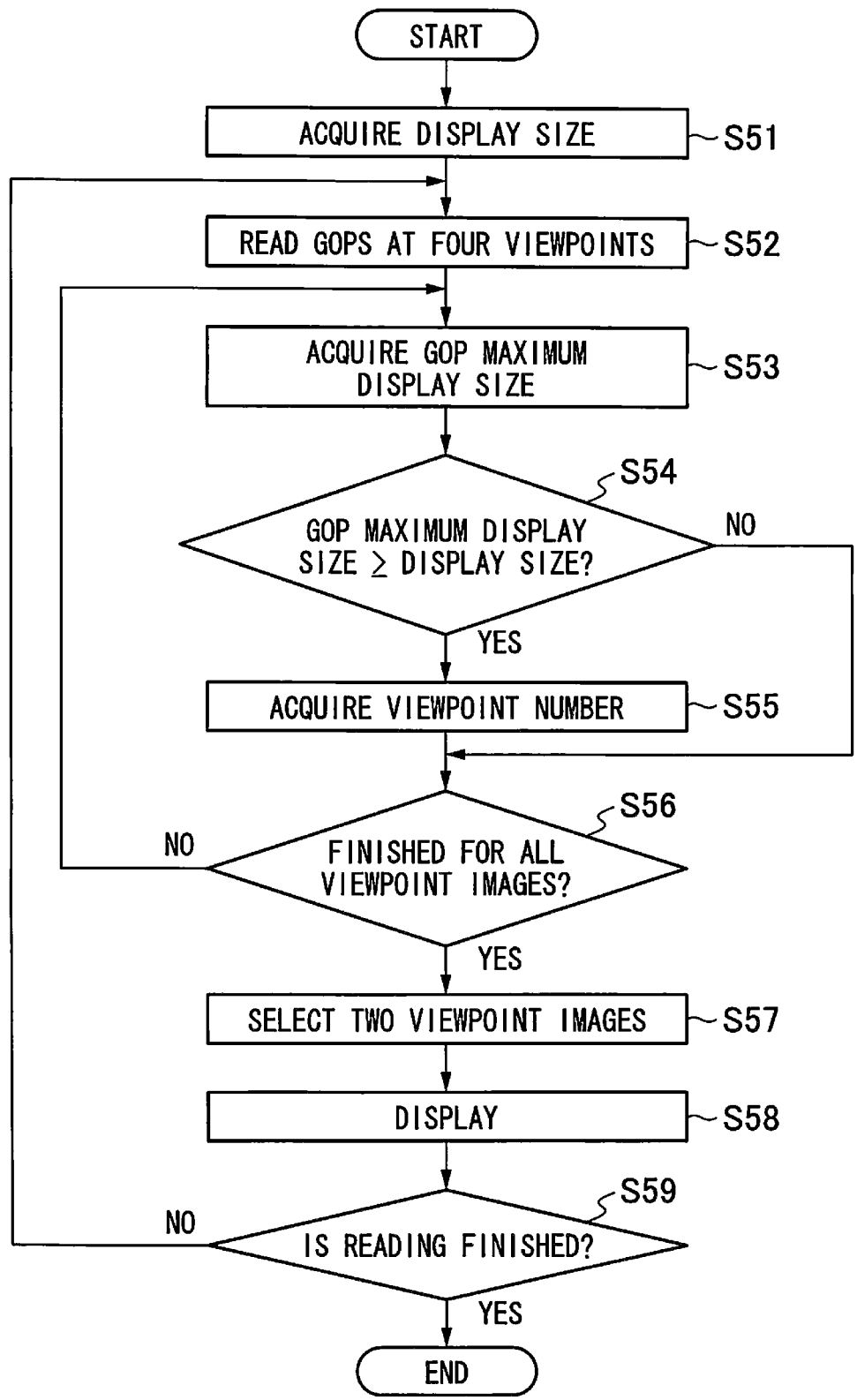
FIG. 19 is a flowchart illustrating the fourth embodiment of 3D video reproduction.

Next, using the flowchart in FIG. 19, an explanation is given to processing of: reading a 3D video file in which viewpoint images at three or more viewpoints are recorded as illustrated in FIG. 9; and reproducing and displaying it.

In FIG. 19, first, the display size (i.e. horizontal width) of a 3D display on which a 3D video is displayed is acquired (step S51). Here, it is assumed that the acquired horizontal width of the display is 600 mm. Also, GOPs for four viewpoints illustrated in FIG. 9 are read (step S52).

Next, the GOP maximum display size is acquired from each of the header areas of the read GOPs in order of the viewpoint number (step S53).

Here, it is assumed that the GOP maximum display sizes, assumed visual distances and GOP maximum parallax amounts (distant view) of the GOPs for four viewpoints are as illustrated in Table 1 listed below.

TABLE 1

| | Viewpoint number | Maximum DSP size | Assumed visual distance | Maximum parallax amount (distance view) |
|---|---|---|---|---|
| Viewpoint image (1) | 1 | 500 mm | 2000 mm | 10% |
| Viewpoint image (2) | 2 | 1200 mm | 4000 mm | 4% |
| Viewpoint image (3) | 3 | 700 mm | 2500 mm | 7% |
| Viewpoint image (4) | 4 | 500 mm | 2000 mm | 10% |

In the example illustrated in above Table 1, first, the GOP maximum display size, 500 mm, of viewpoint image (1) with viewpoint number 1 is acquired.

Next, it is decided whether this acquired GOP maximum display size is equal to or greater than the display size acquired in step S51 (step S54). Here, since the GOP maximum display size is 500 mm while the display size is 600 mm, it proceeds to step S56.

In step S56, it is decided whether the GOP maximum display size has been acquired with respect to all viewpoint images.

Here, since it has not been finished with respect to all viewpoint images yet, it returns to step S53.

In step S53, the viewpoint number is incremented by one and the GOP maximum display size, 1200 mm, of viewpoint image (2) with viewpoint number 2 is acquired next.

Next, it proceeds to step S54, and it is decided whether the acquired GOP maximum display size is equal to or greater than the display size. This time, since the GOP maximum display size is 1200 mm and greater than the display size of 600 mm, it shifts to step S55. In step S55, the current viewpoint number is acquired. Here, viewpoint number 2 is acquired.

Thus, the processing in step S53 to step S55 is repeated with respect to all viewpoint images. By this processing, only the viewpoint number of a viewpoint image whose GOP maximum display size is equal to or greater than the display size is acquired. Here, viewpoint number 2 and viewpoint number 3 are acquired.

Next, from the viewpoint images of the viewpoint numbers acquired in step S55, viewpoint images at two viewpoints to be output to a 3D display are selected (step S57). Here, viewpoint image (1) as an image at a reference viewpoint and either of the image with viewpoint number 2 (i.e. viewpoint image (2)) or the image with viewpoint number 3 (i.e. viewpoint image (3)) are selected.

As a selection criterion, the viewpoint image with the largest parallax amount, the viewpoint image with the smallest parallax amount or the viewpoint image closest to the central viewpoint or the like can be considered. Also, an actual viewpoint image that is actually taken is selected more preferentially than an image at a virtual viewpoint. This criterion may be decided in advance, or a configuration may be employed such that the viewer can freely set it. Here, it is assumed that an image with the largest parallax amount is selected, and, as a result, viewpoint image (1) and viewpoint image (3) are selected.

The viewpoint images at two viewpoints selected in step S57 are stereoscopically displayed on the 3D display (step S58). That is, here, 3D display is performed based on viewpoint image (1) and viewpoint image (3).

Next, it is decided whether the reading of all GOPs from the 3D video file is finished (step S59). In a case where it is not finished ("in the case of NO"), it proceeds to step S52 and the above processing is repeated, and, in a case where it is finished ("in the case of YES"), reproduction of the 3D video is ended.

Here, in a case where there is no viewpoint number acquired in step S55, that is, in a case where the GOP maximum display sizes of all viewpoint images are smaller than the display size, 2D display is performed. Although a criterion to select a viewpoint image subjected to 2D display may be adequately determined too, a viewpoint image at an actual viewpoint and reference viewpoint is preferable.

Thus, it is possible to always display an appropriate 3D video by reading the GOP maximum display size recorded as the attached information of each viewpoint image, comparing it with the display size of a 3D display of output destination and selecting and displaying a pair of viewpoint images in which the GOP maximum display size is larger.

Here, such processing can be performed based on the GOP maximum parallax amount recorded in the attached information of each viewpoint image of the 3D video file.

Fifth Embodiment of 3D Video Reproduction

Figure 20:
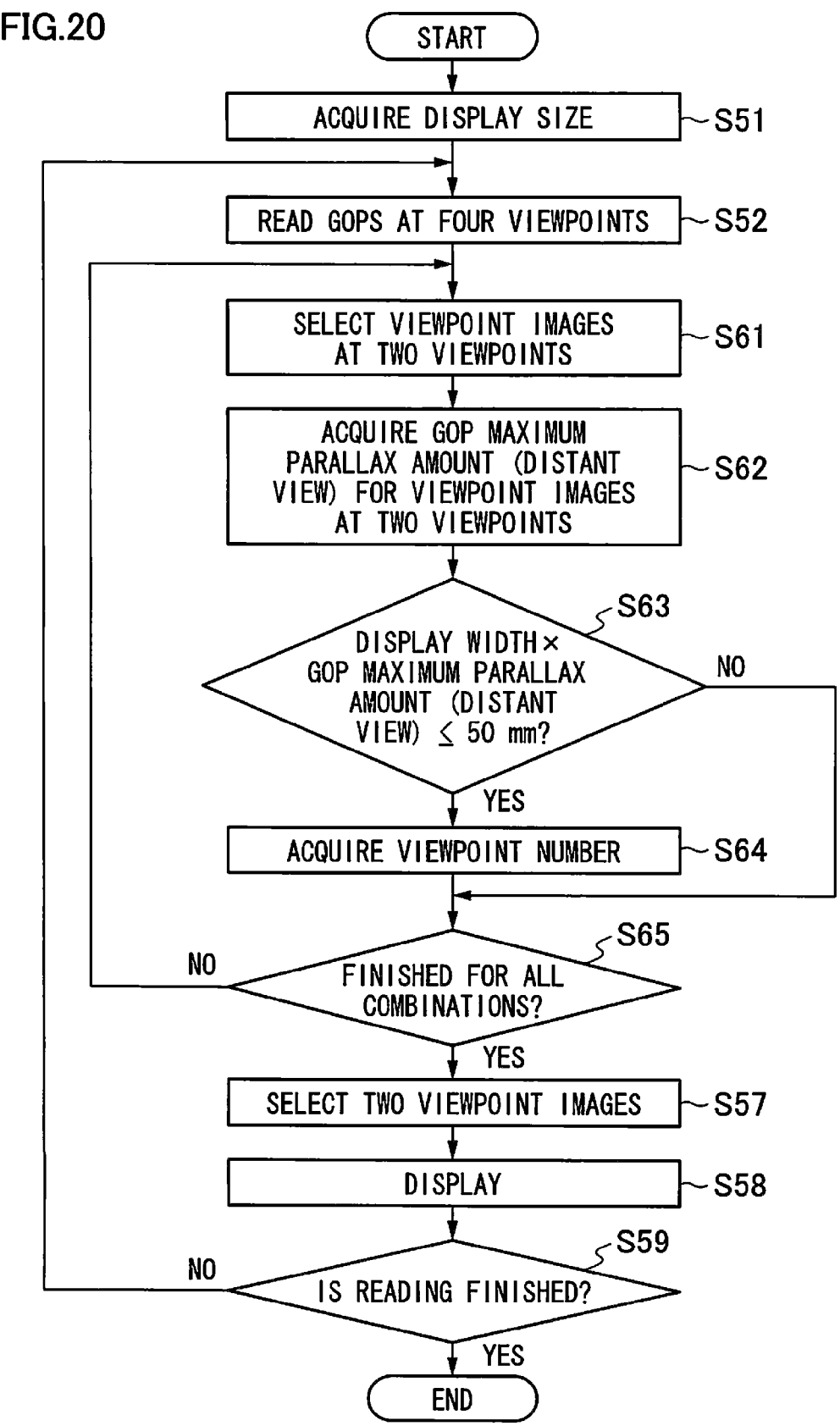
FIG. 20 is a flowchart illustrating the fifth embodiment of 3D video reproduction.

FIG. 20 is a flowchart in the case of selecting a pair of viewpoint images subjected to 3D reproduction display based on the GOP maximum parallax amount. Here, the same reference numerals are assigned to the common parts with the flowchart illustrated in FIG. 19 and their detailed explanations are omitted. Also, it is assumed that the GOP maximum display size is not recorded in the attached information of each viewpoint image of the read 3D video file and other attached information is the same as in the file illustrated in Table 1. Also, it is assumed that the horizontal width of a 3D display of output destination is 600 mm.

Similar to the case of FIG. 19, the display size is acquired (step S51) and GOPs for four viewpoints are read from the 3D video file illustrated in FIG. 9 (step S52). Next, (a pair of) viewpoint images at two viewpoints are selected from each header area of the read GOPs (step S61). Since combinations of all viewpoint images are finally selected, the selection order may be adequately determined. Here, first, it is assumed that viewpoint image (1) and viewpoint image (2) are selected.

The GOP maximum parallax amount (distant view) for these selected images at two viewpoints is acquired (step S62). The GOP maximum parallax amount (distant view) recorded in the attached information of each viewpoint image is a parallax amount with respect to the reference viewpoint image. Therefore, in a case where the reference viewpoint image is not included in the selected viewpoint images at two viewpoints, it is necessary to calculate the GOP maximum parallax amount again.

Here, since one of the selected viewpoint images at two viewpoints is viewpoint image (1) of the reference viewpoint image, the GOP maximum parallax amount (distant view) recorded in the attached information of viewpoint image (2) is the GOP maximum parallax amount (distant view) for these two viewpoints.

Next, it is decided whether the product of the display width acquired in step S51 and the GOP maximum parallax amount (distant view) for the viewpoint images at two viewpoints acquired in step S62 is equal to or less than man's binocular interval of 50 mm (step S63). Also, the man's binocular interval is not limited to 50 mm, and, for example, a numerical value of 65 mm can be used.

In a case where this product is greater than 50 mm, since it is not possible to stereoscopically view the GOP maximum parallax position on the distant view side in an appropriate manner, it is decided that the combination of the viewpoint images at two viewpoints is not a suitable combination for binocular vision, and it proceeds to step S65.

Here, the GOP maximum parallax amount (distant view) is 4% and the product of it and the display width of 600 mm is 24 mm. Therefore, the condition of 50 mm or less is satisfied and it proceeds to step S64. In step S64, the viewpoint numbers of these viewpoint images at two viewpoints are acquired. That is, in this case, a combination of viewpoint numbers 1 and 2 is acquired.

In step S65, it is decided whether the GOP maximum parallax amount has been acquired with respect to all combinations. Here, since it has not been finished for all combinations yet, it returns to step S61.

In the next step S61, (a pair of) different viewpoint images at two viewpoints are selected. Here, it is assumed that viewpoint image (2) and viewpoint image (3) are selected as the viewpoint images at two viewpoints.

In step S62, the GOP maximum parallax amount (distant view) for these two viewpoints is acquired. As described above, since the maximum parallax amount (distant view) recorded in each attached information of viewpoint image (2) and viewpoint image (3) is the maximum parallax amount with respect to viewpoint image (1) of the reference viewpoint image, it is necessary to calculate the GOP maximum parallax amount in two viewpoints of viewpoint image (2) and viewpoint image (3) again.

The GOP maximum parallax amount in two viewpoints is calculated by the difference between the GOP maximum parallax amounts (distant view) recorded in the respective attached information. Therefore, in this case, 7%-4%=3% is the GOP maximum parallax amount (distant view) in two viewpoints of viewpoint image (2) and viewpoint image (3).

In step S63, it is decided whether the product of this calculated GOP maximum parallax amount (distant view) for the viewpoint images at two viewpoints and the display width is equal to or less than 50 mm Here, the GOP maximum parallax amount (distant view) is 3%, and the product of it and the display width of 600 mm is 18 mm. Therefore, the condition of 50 mm or less is satisfied and it proceeds to step S64. In step S64, the viewpoint numbers of these viewpoint images at two viewpoints, that is, a combination of viewpoint numbers 2 and 3 is acquired.

Thus, the processing in step S62 to step S64 is repeated with respect to all combinations of viewpoint images. By this processing, only the viewpoint numbers in a combination of viewpoint images in which the product of the GOP maximum parallax amount (distant view) and the display size is 50 mm or less is acquired. Here, combinations of viewpoint numbers 1 and 2, viewpoint numbers 2 and 3, viewpoint numbers 2 and 4 and viewpoint numbers 3 and 4 are acquired.

Next, viewpoint images at two viewpoints to be output to a 3D display is selected from the combinations of viewpoint numbers acquired in step S64 (step S57).

As a selection criterion, as described above, it may give priority to: a combination in which the GOP parallax amount is the largest; a combination in which the GOP parallax amount is the smallest; a combination including a viewpoint image close to the central viewpoint; and an actual viewpoint image. This criterion may be decided in advance, or a configuration may be employed such that the viewer can freely set it. Here, it is assumed that a combination of viewpoint number 2 and viewpoint number 3, which is a combination in which the parallax amount is the smallest, that is, viewpoint image (2) and viewpoint image (3) are selected.

The viewpoint images at two viewpoints selected in step S57 are stereoscopically displayed on a 3D display (step S58). That is, in this case, the 3D display is performed based on viewpoint image (2) and viewpoint image (3).

Next, it is decided whether the reading of all GOPs from the 3D video file is finished (step S59). In a case where it is not finished ("in the case of NO"), it proceeds to step S52 and the above processing is repeated, and, in a case where it is finished (i.e. "in the case of YES"), the reproduction of the 3D video is ended.

Also, in a case where there is no viewpoint number acquired in step S64, that is, in a case where the condition in step S63 is not satisfied in all combinations, 2D display is performed. Also, a criterion to select an image subjected to 2D display may be adequately determined.

Thus, it is possible to always display an appropriate 3D video by reading the GOP maximum parallax amount (distant view) recorded as the attached information of each viewpoint image, calculating the product of it and the display size of a 3D display of output destination and selecting and displaying a combination of viewpoint images in which the product is smaller than man's binocular interval.

Sixth Embodiment of 3D Video Reproduction

As explained in the fourth embodiment, in a case where a display image is selected based on the GOP maximum display size recorded in the attached information of each viewpoint image, the image can be selected only by a combination with a reference viewpoint image. By contrast with this, as explained in the fifth embodiment, in a case where a viewpoint image is selected based on the GOP maximum parallax amount (distant view) recorded in the attached information of each viewpoint image, a decision can be made on combinations of all viewpoint images but the processing becomes complicated.

Therefore, in the sixth embodiment, in a case where both the GOP maximum display size and the GOP maximum parallax amount (distant view) are recorded in attached information, a viewpoint image is selected using the both information.

Figure 21:
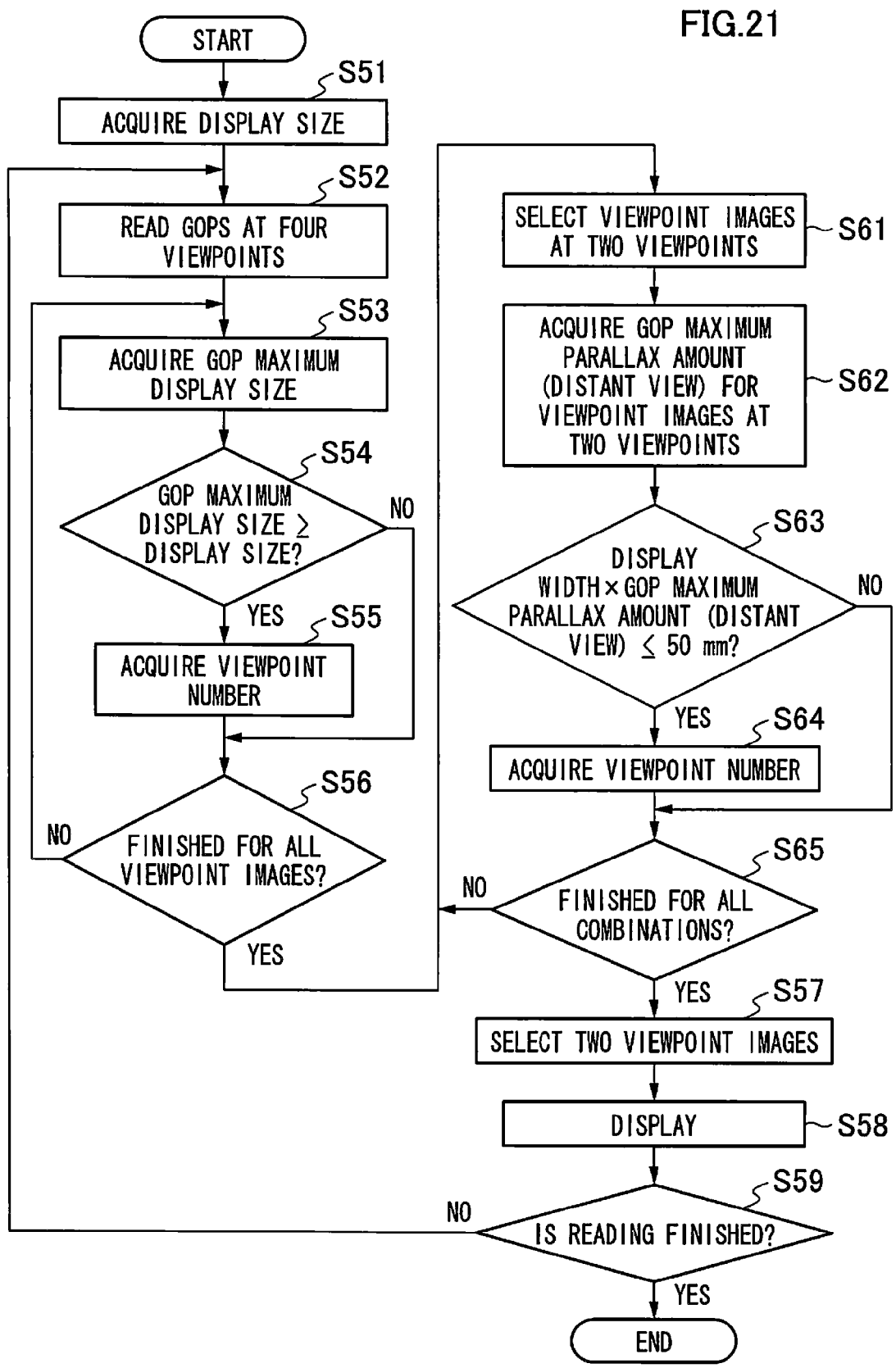
FIG. 21 is a flowchart illustrating the sixth embodiment of 3D video reproduction.

FIG. 21 is a flowchart illustrating a case where a viewpoint image is selected based on the GOP maximum display size and the GOP maximum parallax amount (distant view). Here, the same reference numerals are assigned to the common parts with the flowcharts illustrated in FIG. 19 and FIG. 20, and their detailed explanations are omitted.

As illustrated in FIG. 21, first, similar to the case of FIG. 19, a viewpoint image that can be stereoscopically displayed is selected based on the GOP maximum display size (steps S53 to S56).

After that, similar to the case of FIG. 20, a viewpoint image that can be stereoscopically displayed is selected based on the GOP maximum parallax amount (distant view) (steps S61 to S65). Here, at this time, it is not necessary to perform processing on a combination with the reference viewpoint image.

After that, viewpoint images at two viewpoints to be output to the 3D display are selected from the combination with the reference viewpoint image acquired in step S55 and the combination of viewpoint images at two viewpoints acquired in step S64 (step S57). A selection criterion may be adequately determined in the same way as above.

As described above, by selecting viewpoint images at two viewpoints displayed based on the GOP maximum display size and the GOP maximum parallax amount (distant view), it is possible to shorten the processing time while performing 3D display using appropriate viewpoint images selected from all combinations.

Here, viewpoint images at two viewpoints to be displayed are selected based on only the GOP maximum parallax amount on the distant view side, it may be determined in consideration of the GOP maximum parallax amount on the near view side. By taking into consideration the GOP maximum parallax amount on the near view side, it is possible to determine a combination of images that can be stereoscopically viewed in an appropriate manner on not only the distant view side but also the near view side.

For example, from the combinations of viewpoint images at two viewpoints acquired in step S64, it is possible to select a combination in which the parallax amount in the near view is equal to or less than a predetermined value. This is because, when the parallax amount on the near view side increases, the viewer feels fatigued for binocular vision and therefore it is preferable to be equal to or less than a value such as 50 mm.

In a case where the GOP maximum parallax amount on the near view side is recorded in a 3D video file, the value can be used. Also, as explained using FIG. 10, it is possible to extract the feature point from each viewpoint image and calculate it from the maximum parallax amount position on the near view side.

Seventh Embodiment of 3D Video Reproduction

Figure 22:
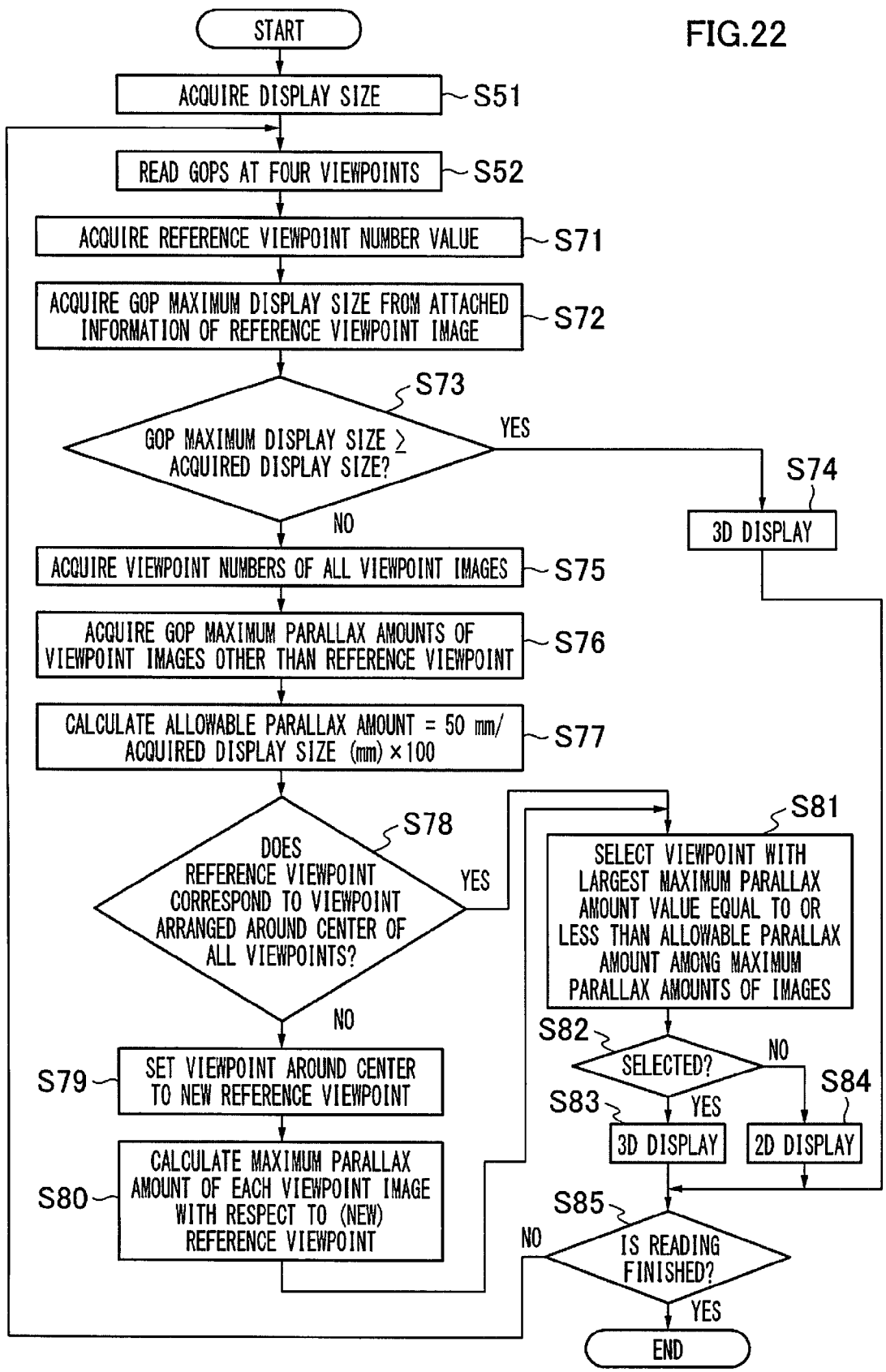
FIG. 22 is a flowchart illustrating the seventh embodiment of 3D video reproduction.

FIG. 22 is a flowchart illustrating image reproduction processing according to the seventh embodiment.

Here, it is assumed that a read 3D video file is similar to the file illustrated in Table 1. Also, it is assumed that the horizontal width of a display is 1300 mm Similar to the case of FIG. 19, the display size of the 3D display of output destination is acquired (step S51). For example, it is possible to acquire the display size from the 3D display connected by an HDMI cable.

Next, GOPs for four viewpoints are read from the 3D video file illustrated in FIG. 9 (step S52) and the value of the reference viewpoint number tag is read from each header area of the read GOPs (step S71). In the present embodiment, reference viewpoint number 1 is read.

Next, the GOP maximum display size is acquired from attached information of the viewpoint image of reference viewpoint number 1, that is, viewpoint image (1) (step S72).

As described above, the value recorded herein is the GOP maximum display size in a viewpoint combination with viewpoint image (1) in which the parallax amount is maximum, specifically, it is the GOP maximum display size in a combination with viewpoint image (4).

This GOP maximum display size and the display size acquired in step S71 are compared (step S73). In a case where the GOP maximum display size is larger than the display size ("in the case of YES"), since there is no problem if viewpoint image (1) and viewpoint image (4) are stereoscopically displayed as is, these viewpoint images at two viewpoints are stereoscopically displayed on a 3D display (step S74).

By contrast, in a case where the comparison result in step S73 is "NO," it proceeds to step S75.

In step S75, the viewpoint numbers of all read viewpoint images are acquired. Further, from the attached information of each viewpoint image, the value of the GOP maximum parallax amount of each viewpoint image is acquired (step S76). As illustrated in Table 1, the GOP maximum parallax amount of 4% is acquired from viewpoint image (2), the GOP maximum parallax amount of 7% is acquired from viewpoint image (3) and the GOP maximum parallax amount of 10% is acquired from viewpoint image (4).

Next, the allowable parallax amount in the 3D display on which 3D display is performed is calculated (step S77). The allowable parallax amount is calculated by following {Equation 3}. Here, the display size indicates the horizontal width of the display. Also, although man's binocular interval is 50 mm in this case, other numeral values may be used.

Allowable parallax amount [%]=50 mm÷display size [mm]×100       {Equation 3}

In the present embodiment, since the display size is 1300 mm, the allowable parallax amount is 3.85%.

Next, arrangement of a reference viewpoint is confirmed (step S78). In a case where the reference viewpoint is not around the center of all viewpoints, a viewpoint position around the center is set to a new reference viewpoint (step S79), and the maximum parallax amount of each viewpoint image with respect to the new reference viewpoint is calculated (step S80).

In the present embodiment, since the viewpoint numbers are as illustrated in FIG. 8, viewpoint number 1 of the reference viewpoint is not around the center. Therefore, in this case, viewpoint number 2 is set to a new reference viewpoint as a viewpoint around the center.

The GOP maximum parallax amount of each viewpoint image with respect to viewpoint number 2 corresponding to this new reference viewpoint is calculated. In the 3D video file example in Table 1, the absolute value of the difference between the GOP maximum parallax amount described in the attached information of each viewpoint image and the GOP maximum parallax amount described in the attached information of viewpoint image (2), is the GOP maximum parallax amount in the new reference viewpoint. Therefore, the GOP maximum parallax amount of each viewpoint image is as follows.

GOP maximum parallax amount of viewpoint image (1)=|0%-4%|=4%

GOP maximum parallax amount of viewpoint image (2)=|4%-4%|=0%

GOP maximum parallax amount of viewpoint image (3)=|7%-4%|=3%

GOP maximum parallax amount of viewpoint image (4)=|10%-4%|=6%

Here, such processing is performed because a viewpoint image arranged closer to the center is suitable for 3D display.

In a case where the processing in step S80 is finished or it is decided in step S78 that the reference viewpoint is around the center of all viewpoints, a viewpoint with the maximum value equal to or less than the allowable parallax amount is selected from these GOP maximum parallax amounts (step S81). In the present embodiment, since the allowable parallax amount is 3.85% or less, a viewpoint satisfying this condition is viewpoint number 3.

Thus, in a case where a viewpoint satisfying the condition can be selected (step S82), 3D display is performed using the reference viewpoint image and the selected viewpoint image (step S83). In a case where it cannot be selected ("in the case of NO" in step S82), 2D display is performed (step S84).

For example, if the acquired display size is 1700 mm, the allowable parallax amount is 2.94%, and it is not possible to select a viewpoint having the largest maximum parallax amount value equal to or less than the allowable parallax amount. In this case, 2D display is performed.

Thus, since a pair of viewpoint images is selected based on the allowable parallax amount, it is possible to select viewpoint images suitable for binocular vision in an appropriate manner.

Next, it is decided whether the reading of all GOPs from the 3D video file is finished (step S85). In a case where it is not finished ("in the case of NO"), it proceeds to step S52 and the above processing is repeated, and, in a case where it is finished ("in the case of YES"), the reproduction of the 3D video is ended.

Also, in a case where it is decided in step S82 that the selection is not possible, instead of performing 2D display, 3D display may be performed after performing parallax shift or parallax compression for adjustment to an appropriate parallax amount. Also, in the fourth to seventh embodiments of 3D video reproduction, although parallax correction is performed every one GOP, it is not limited to this, and parallax correction may be performed every scene using the scene maximum display size and the scene maximum parallax amount.

{Stereoscopic Video Reproduction Device}

The above first to seventh embodiments of 3D video reproduction may be realized by the 3D video reproduction function of the stereoscopic imaging device 10 illustrated in FIGS. 11A, 11B and FIG. 12, or may be realized by a stereoscopic video reproduction device that does not have an imaging unit.

Figure 23:
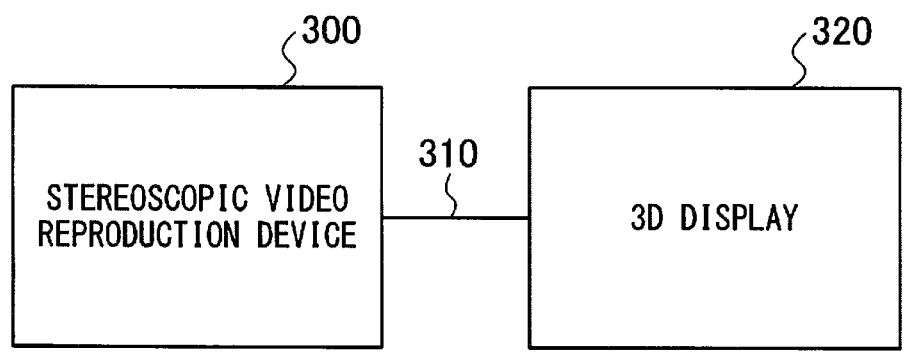
FIG. 23 is a diagram illustrating the whole structure of a stereoscopic video reproduction device and 3D display.

FIG. 23 is a diagram illustrating the whole structure of a stereoscopic video reproduction device 300 and 3D display 320. As illustrated in the figure, the stereoscopic video reproduction device 300 and the 3D display 320 are devices that are separately provided, and are connected by a communication cable 310 such that communication is possible.

The 3D display 320 is a display of a parallax barrier system or lenticular system, and alternately displays the left viewpoint image and right viewpoint image input from the stereoscopic video reproduction device 300 to the 3D display 320 every one line.

Also, the 3D display 320 may alternately switches the left viewpoint image and the right viewpoint image in a temporal manner and displays them. In this case, the viewer visually checks the 3D display 320 using special glasses.

Figure 24:
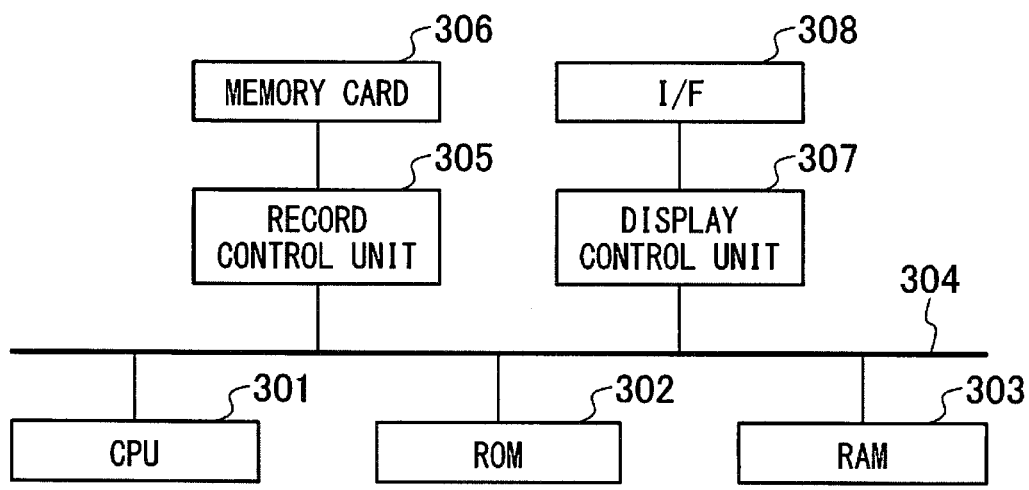
FIG. 24 is a block diagram illustrating an internal structure of a stereoscopic video reproduction device.

FIG. 24 is a block diagram illustrating an internal structure of the stereoscopic video reproduction device 300. As illustrated in the figure, the stereoscopic video reproduction device 300 includes a CPU 301, a record control unit 305, a memory card 306, a display control unit 307 and a communication interface 308.

The CPU 301 performs integration control of the overall operation of the stereoscopic video reproduction device 300 based on a control program such as a stereoscopic video reproduction program recorded in a ROM 302. A RAM 303 is used as a computation work area of the CPU 301.

The record control unit 305 and the display control unit 307 are connected to the CPU 301 through a bus 304. The record control unit 305 controls the reading and writing of 3D video file data with respect to the memory card 306. For example, the memory card 306 is the same as the memory card 40 of the stereoscopic imaging device 10 illustrated in FIG. 12, and records a 3D video file including the attached information of each viewpoint image taken in the stereoscopic imaging device 10.

The communication interface 308 is a connector unit to which a communication cable 310 is connected, and the display control unit 307 displays a 3D video on the 3D display 320 through these. As the communication interface 308 and the communication cable 310, the ones of the HDMI standard may be adopted. According to the HDMI standard, the stereoscopic video reproduction device 300 can acquire the display size of the 3D display 320 connected through the communication cable 310.

Here, the stereoscopic video reproduction device 300 may be configured to: include a compound eye imaging unit to take each viewpoint image; and record the taken viewpoint image in the memory card 306. Also, the stereoscopic video reproduction device 300 and the 3D display 320 may be formed as an integral device. Also, a stereoscopic video reproduction program may be installed in a personal computer so as to cause the personal computer to function as the stereoscopic video reproduction device 300.

Further, it is needless to say that the present invention is not limited to the above embodiments and various changes are possible without departing from the spirit of the present invention.

REFERENCE SIGNS LIST

10 Stereoscopic imaging device
14-1, 14-2 Imaging optical system
16 Liquid crystal monitor
20-1, 20-2 Imaging unit
21 Focus lens and zoom lens
24 CCD
25 Analog signal processing unit
32 Central processing unit (CPU)
34 Operation unit
40 Memory card
44 Digital signal processing unit
100 Object
101-1 to 101-4 Imaging device
211N, 212N Maximum parallax amount position (near view)
211F, 212F Maximum parallax amount position (distant view)
213N Maximum parallax amount on near view side
213F Maximum parallax amount on distant view side
300 Stereoscopic video reproduction device
320 3D display

The invention claimed is:

1. A stereoscopic video processor comprising:
a stereoscopic video acquisition unit that acquires a stereoscopic video in which a stereoscopic image formed with a plurality of viewpoint images is consecutively provided in a time axis direction;
a parallax amount calculation unit that calculates a parallax amount indicating a shift amount between feature points with a common feature, from a plurality of viewpoint images every frame of the acquired stereoscopic video;
a maximum parallax amount acquisition unit that acquires a maximum parallax amount on a distant view side from the calculated parallax amount of each feature point every frame;
an intra-interval maximum parallax amount acquisition unit that acquires an intra-interval maximum parallax amount which is the largest in every predetermined interval of the stereoscopic video, in the acquired maximum parallax amount on the distant view side;
an intra-interval maximum display size acquisition unit that acquires an intra-interval maximum display size in which binocular fusion is possible when the stereoscopic video is displayed on a stereoscopic display every predetermined interval, based on the intra-interval maximum parallax amount acquired every predetermined interval of the stereoscopic video;
a recording unit that generates a stereoscopic video file in which the stereoscopic video is recorded, records the stereoscopic video file in a recording medium, records the stereoscopic video in the stereoscopic video file and records the intra-interval maximum display size every predetermined interval in the stereoscopic video file as attached information; and
a representative image setting unit that sets one of viewpoint images at N viewpoints acquired by the stereoscopic video acquisition unit as a representative image, where N is an integral number equal to or greater than 3, wherein:
the maximum parallax amount acquisition unit acquires (N−1) items of maximum parallax amounts on the distant view side in association with two viewpoint images of different combinations, which are formed with the representative image and each of viewpoint images at (N−1) viewpoints excluding the representative image of the viewpoint images at the N viewpoints;
the intra-interval maximum display size acquisition unit acquires (N−1) items of intra-interval maximum display sizes, each of which is the maximum in the predetermined interval, every predetermined interval, based on the acquired (N−1) items of maximum parallax amounts on the distant view side; and
the recording unit records the acquired (N−1) items of intra-interval maximum display sizes in the stereoscopic video file as the attached information.

2. The stereoscopic video processor according to claim 1, wherein the recording unit further records the intra-interval maximum parallax amount acquired every predetermined interval of the stereoscopic video by the intra-interval maximum parallax amount acquisition unit, as the attached information of the stereoscopic video file.

3. The stereoscopic video processor according to claim 1, wherein the recording unit further records an assumed visual distance corresponding to a distance between a viewer and a stereoscopic display, which is suitable to observe the stereoscopic video, as the attached information of the stereoscopic video file.

4. The stereoscopic video processor according to claim 1, wherein:
the maximum parallax amount acquisition unit acquires a maximum parallax amount on a near view side in the calculated parallax amount of each feature point; and
the intra-interval maximum parallax amount acquisition unit acquires an intra-interval maximum parallax amount which is the largest in the predetermined interval every predetermined interval, in the acquired maximum parallax amount on the near view side.

5. The stereoscopic video processor according to claim 1, further comprising a virtual viewpoint image generation unit that generates one or more of virtual viewpoint images corresponding to arbitrary virtual viewpoints, based on at least one viewpoint image of a plurality of viewpoint images acquired by the stereoscopic video acquisition unit and the parallax amount calculated by the parallax amount calculation unit.

6. The stereoscopic video processor according to claim 1, wherein:
the stereoscopic video file is an MPEG file in which a plurality of viewpoint images are sequentially recorded every one GOP formed with a plurality of frames; and
the predetermined interval of the stereoscopic video is an interval corresponding to a predetermined number of GOPs equal to one or two, or greater than two.

7. The stereoscopic video processor according to claim 1, wherein the recording unit records at least one of the intra-interval maximum display size and the intra-interval maximum parallax amount acquired every interval, in a head of an interval a predetermined number of intervals before the interval, or a head of the stereoscopic video file.

8. The stereoscopic video processor according to claim 1, wherein the recording unit records the viewpoint images at the N viewpoints in order of viewpoint arrangement or in order from the viewpoint image closer to a central viewpoint.

9. The stereoscopic video processor according to claim 5, wherein, at a time of recording the plurality of viewpoint images and virtual viewpoint images in the stereoscopic video file, the recording unit records viewpoint information indicating whether each image is an image at an actual viewpoint or an image at a virtual viewpoint, as the attached information of the stereoscopic video file.

10. The stereoscopic video processor according to claim 1, wherein the intra-interval maximum display size acquisition unit acquires a maximum display size in a display size in which an image shift amount on a stereoscopic display corresponding to the intra-interval maximum parallax amount on the distant view side acquired by the intra-interval maximum parallax amount acquisition unit does not exceed man's binocular interval, as an intra-interval maximum display size in which binocular fusion is possible.

11. The stereoscopic video processor according to claim 10, wherein, based on the intra-interval maximum parallax amount on the distant view side acquired by the intra-interval maximum parallax amount acquisition unit, the intra-interval maximum display size acquisition unit reads a corresponding maximum display size from a storage unit in which a maximum display size corresponding to a maximum parallax amount is recorded in advance, or calculates the intra-interval maximum display size using an equation including a predetermined value indicating the man's binocular interval.

12. A non-transitory programmable storage medium tangibly embodying a stereoscopic video processing program of machine-readable instructions executable by a digital processing apparatus to realize a stereoscopic video processor according to claim 1.

13. A stereoscopic imaging device comprising:
an imaging unit that functions as the stereoscopic video acquisition unit; and
a stereoscopic video processor according to claim 1.

14. A stereoscopic video processing method comprising the steps of:
acquiring a stereoscopic video in which a stereoscopic image formed with a plurality of viewpoint images is consecutively provided in a time axis direction;
calculating a parallax amount indicating a shift amount between feature points with a common feature, from a plurality of viewpoint images every frame of the acquired stereoscopic video;
acquiring a maximum parallax amount on a distant view side from the calculated parallax amount of each feature point every frame;
acquiring an intra-interval maximum parallax amount which is the largest in every predetermined interval of the stereoscopic video, in the acquired maximum parallax amount on the distant view side;
acquiring an intra-interval maximum display size in which binocular fusion is possible when the stereoscopic video is displayed on a stereoscopic display every predetermined interval, based on the intra-interval maximum parallax amount acquired every predetermined interval of the stereoscopic video;
generating a stereoscopic video file in which the stereoscopic video is recorded, recording the stereoscopic video file in a recording medium, recording the stereoscopic video in the stereoscopic video file and recording the intra-interval maximum display size every predetermined interval in the stereoscopic video file as attached information; and
setting one of viewpoint images at N viewpoints acquired by the stereoscopic video acquisition unit as a representative image, where N is an integral number equal to or greater than 3, wherein:
the step of acquiring the maximum parallax amount includes acquiring (N−1) items of maximum parallax amounts on the distant view side in association with two viewpoint images of different combinations, which are formed with the representative image and each of viewpoint images at (N−1) viewpoints excluding the representative image of the viewpoint images at the N viewpoints;
the step of acquiring the intra-interval maximum display size includes acquiring (N−1) items of intra-interval maximum display sizes, each of which is the maximum in the predetermined interval, every predetermined interval, based on the acquired (N−1) items of maximum parallax amounts on the distant view side; and
the step of recording the intra-interval maximum display size includes recording the acquired (N−1) items of intra-interval maximum display sizes in the stereoscopic video file as the attached information.

* * * * *